US009603207B2

(12) United States Patent
Itoh et al.

(10) Patent No.: US 9,603,207 B2
(45) Date of Patent: Mar. 21, 2017

(54) DRIVING CIRCUIT, ILLUMINATION LIGHT SOURCE, AND ILLUMINATION DEVICE

(71) Applicant: Panasonic Intellectual Property Management Co., Ltd., Osaka (JP)

(72) Inventors: Kazuhiko Itoh, Osaka (JP); Akira Takahashi, Osaka (JP); Masanobu Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/762,629

(22) PCT Filed: Jan. 21, 2014

(86) PCT No.: PCT/JP2014/000288
§ 371 (c)(1),
(2) Date: Jul. 22, 2015

(87) PCT Pub. No.: WO2014/122891
PCT Pub. Date: Aug. 14, 2014

(65) Prior Publication Data
US 2015/0366014 A1 Dec. 17, 2015

(30) Foreign Application Priority Data
Feb. 6, 2013 (JP) .................. 2013-021736

(51) Int. Cl.
*H05B 33/08* (2006.01)
*H02M 1/42* (2007.01)
(Continued)

(52) U.S. Cl.
CPC ...... *H05B 33/0815* (2013.01); *H02M 1/4225* (2013.01); *H02M 3/1582* (2013.01);
(Continued)

(58) Field of Classification Search
CPC ............ H05B 33/0815; H05B 33/0818; H05B 33/0809; H05B 37/029; H05B 37/02;
(Continued)

(56) References Cited

U.S. PATENT DOCUMENTS

| 8,253,400 B2 * | 8/2012 | Irissou | H02M 3/156 323/282 |
| 2007/0040516 A1 * | 2/2007 | Chen | H05B 39/045 315/291 |

(Continued)

FOREIGN PATENT DOCUMENTS

| JP | 2005-142137 | 6/2005 |
| JP | 2011-108529 | 6/2011 |

(Continued)

OTHER PUBLICATIONS

International Search Report and Written Opinion for corresponding International Application No. PCT/JP2014/000288 mailed Apr. 28, 2014.

Primary Examiner — Douglas W Owens
Assistant Examiner — Syed M Kaiser
(74) Attorney, Agent, or Firm — Renner, Otto, Boisselle & Sklar, LLP

(57) ABSTRACT

A driving circuit includes a rectifying and smoothing circuit that rectifies an AC dimming signal, and a voltage conversion circuit including: a switching element having a source connected to a low-potential output terminal of the rectifying and smoothing circuit; a diode having an anode connected to a high-potential output terminal of the rectifying and smoothing circuit; an inductor disposed between the diode and a drain of the switching element; an oscillation controller; a capacitor that is charged by receiving magnetic energy from the inductor when the switching element is OFF, and discharges to a load when the switching element is ON; and a power control circuit that applies a voltage
(Continued)

corresponding to a voltage at a high-potential terminal of the capacitor to the oscillation controller as a supply voltage for driving the oscillation controller.

10 Claims, 30 Drawing Sheets

(51) Int. Cl.
  *H02M 3/158* (2006.01)
  *H02M 1/08* (2006.01)
  *H02M 1/00* (2006.01)
(52) U.S. Cl.
  CPC ..... *H05B 33/0845* (2013.01); *H05B 33/0848* (2013.01); *H02M 1/081* (2013.01); *H02M 2001/007* (2013.01); *Y02B 20/346* (2013.01)
(58) Field of Classification Search
  CPC .............. H05B 41/3925; H05B 41/391; H05B 41/2828; H05B 33/0803
  USPC .................................. 315/291, 294, 307, 282
  See application file for complete search history.

(56) References Cited

U.S. PATENT DOCUMENTS

| | | | |
|---|---|---|---|
| 2011/0234123 A1* | 9/2011 | Myers ................ | H05B 33/0815 |
| | | | 315/307 |
| 2013/0163243 A1* | 6/2013 | Reed .................. | H05B 33/0803 |
| | | | 362/235 |

FOREIGN PATENT DOCUMENTS

| | | |
|---|---|---|
| JP | 2012-084489 | 4/2012 |
| JP | 2013-026079 | 2/2013 |

\* cited by examiner

US 9,603,207 B2

DRIVING CIRCUIT, ILLUMINATION LIGHT SOURCE, AND ILLUMINATION DEVICE

TECHNICAL FIELD

The present invention relates to a driving circuit that causes a light-emitting device to emit light, and to an illumination light source and an illumination device each including the driving circuit.

BACKGROUND ART

In recent years, light emitting diodes (hereinafter referred to as "LEDs") have improved light-emitting efficiency, and have become popular as general illumination light sources. These LEDs require DC power as a power supply for driving the LEDs.

In contrast, conventional techniques suggest driving circuits that convert AC supplied from a domestic AC power supply into DC and output the DC (see Patent Literature (PTL) 1). PTL 1 discloses a driving circuit including: a rectifying and smoothing circuit including a capacitor connected between output terminals of a diode bridge; and a voltage conversion circuit including a booster circuit connected to output terminals of the rectifying and smoothing circuit.

Furthermore, many dimmer-compatible driving circuits are sold to expand the market of luminaires including LEDs.

CITATION LIST

Patent Literature

[PTL 1] Japanese Unexamined Patent Application Publication No. 2005-142137

SUMMARY OF INVENTION

Technical Problem

Considering each half cycle of the AC voltage in the conventional driving circuit, the period when the current from the AC power supply flows through the smoothing capacitor via the diode bridge is limited to a period when the output voltage of the diode bridge is higher than the voltage across the smoothing capacitor. In the driving circuit described in PTL 1, the maximum charging voltage of the capacitor is equal to the maximum output voltage of the rectifying circuit. Thus, in a half cycle of the AC voltage supplied from the AC power supply after the output voltage of the diode bridge reaches its maximum, the voltage across the smoothing capacitor is higher than the output voltage of the rectifying circuit. Thus, the current flowing from the AC power supply to the smoothing capacitor through the rectifying circuit is interrupted. Thus, the power factor given by the product of the current and the voltage of the driving circuit is as low as 0.5, which is dependent on only the first half of each half cycle of the AC.

Thus, the power factor in the half cycle after the first quarter, that is, after the output voltage of the diode bridge reaches its maximum needs to be improved by providing a period when the voltage across the smoothing capacitor is lower than the output voltage of the rectifying circuit to extend a period when the current flows from the AC power supply to the smoothing capacitor through the rectifying circuit.

In addition, when the driving circuit has a dimming function, the power factor needs to be improved in an overall range of the output voltage of the rectifying circuit that fluctuates according to an amount of the dimming operation of the user or others. On the other hand, it becomes difficult to smoothly change the luminance of the LED according to the amount of the dimming operation. Particularly, it is feared that abrupt change in luminance or flicker may occur in the higher and lower luminance regions.

The present invention has been conceived in view of the problems, and the object thereof is to provide a driving circuit and others that improve the power factor and suppress abrupt change in luminance caused by the dimming operation.

Solution to Problem

In order to achieve the object, a driving circuit according to an aspect of the present invention is a driving circuit that converts a phase-controlled AC dimming signal into a DC signal according to a dimming level, and causes a light-emitting device to emit light, using the DC signal, the driving circuit including: a rectifying circuit that rectifies the AC dimming signal; and a voltage conversion circuit that is connected between a low-potential output terminal and a high-potential output terminal of the rectifying circuit, and converts an input voltage from the rectifying circuit and applies a DC voltage to the light-emitting device, the voltage conversion circuit including: a switching element having one end connected to the low-potential output terminal of the rectifying circuit; a first diode having an anode connected to the high-potential output terminal of the rectifying circuit; a first inductor having one end connected to a cathode of the first diode, and another end connected to another end of the switching element; an oscillation controller that controls a pulse signal to be supplied to a control terminal that controls ON and OFF of the switching element; a first capacitor that is charged by receiving magnetic energy from the first inductor when the switching element is OFF, and discharges to the light-emitting device when the switching element is ON; and a power control circuit that applies a voltage corresponding to a voltage at a high-potential terminal of the first capacitor, to the oscillation controller as a supply voltage for driving the oscillation controller, wherein the driving circuit alternates between a first state and a second state, the first state being a state in which when the switching element is ON, the first capacitor discharges and the magnetic energy is stored in the first inductor with a current flowing from the rectifying circuit to the first inductor through the first diode, the second state being a state in which when the switching element is OFF, the magnetic energy stored in the first inductor is discharged to the first capacitor, and the current flows from the rectifying circuit to the first inductor through the first diode to compensate for the magnetic energy discharged from the first inductor.

Furthermore, the driving circuit according to the aspect may further include: a second inductor having one end connected to the one end of the first inductor, and another end connected to a cathode of the light-emitting device; and a second diode having an anode connected to the another end of the first inductor, and a cathode connected to the high-potential terminal of the first capacitor, wherein the high-potential terminal of the first capacitor may be connected to an anode of the light-emitting device and to an input terminal of the power control circuit, and the first capacitor may have a low-potential terminal connected to the low-potential output terminal of the rectifying circuit.

Furthermore, the driving circuit according to the aspect may further include: a second capacitor inserted in series between the cathode of the first diode and the one end of the first inductor; a second diode having an anode connected to a connecting point between the first diode and the second capacitor, and a cathode connected to the high-potential terminal of the first capacitor; a second inductor having one end connected to the another end of the first inductor, and another end connected to the cathode of the second diode; and a third diode having an anode connected to the another end of the first inductor, and a cathode connected to an anode of the light-emitting device, wherein the high-potential terminal of the first capacitor may be connected to an input terminal of the power control circuit, and the first capacitor may have a low-potential terminal connected to the low-potential output terminal of the rectifying circuit.

Furthermore, the driving circuit according to the aspect may further include: a second inductor having one end connected to the another end of the first inductor, and another end connected to a cathode of the light-emitting device; a second diode having an anode connected to the cathode of the first diode, and a cathode connected to the high-potential terminal of the first capacitor; and a third diode having an anode connected to the another end of the first inductor, and a cathode connected to the high-potential terminal of the first capacitor, wherein the high-potential terminal of the first capacitor may be connected to an anode of the light-emitting device and to an input terminal of the power control circuit, and the first capacitor may have a low-potential terminal connected to the low-potential output terminal of the rectifying circuit.

Furthermore, in the driving circuit according to the aspect, the power control circuit may further include a second resistor element having one end connected to the high-potential output terminal of the rectifying circuit, and another end connected to the power supply terminal.

Furthermore, in the driving circuit according to the aspect, the dimming signal detection circuit may include: a third resistor element having one end connected to the high-potential output terminal of the rectifying circuit, and another end connected to an input terminal of the oscillation controller to which the dimming signal voltage is applied; a fourth resistor element having one end connected to the input terminal of the oscillation controller, and another end connected to the low-potential output terminal of the rectifying circuit; and a third capacitor having one end connected to the input terminal of the oscillation controller, and another end connected to the low-potential output terminal of the rectifying circuit.

Furthermore, an illumination light source according to an aspect of the present invention includes the driving circuit and the light-emitting device.

Furthermore, an illumination device according to an aspect of the present invention includes the illumination light source, and a dimmer that generates the AC dimming signal using an AC power supply.

Advantageous Effects of Invention

According to the present invention, a current flows from the rectifying circuit to the first inductor in the voltage conversion circuit, in any of a first state (state where a switching element is conducting) and a second state (state where a switching element is nonconducting). Accordingly, a period during which a current flows from the AC power supply to the voltage conversion circuit through the rectifying circuit can be extended. Furthermore, the supply voltage for driving the switching element can be secured from the first capacitor in the voltage conversion circuit. Accordingly, the driving circuit can improve the power factor and suppress abrupt change in luminance in the dimming.

BRIEF DESCRIPTION OF DRAWINGS

FIG. 3A is a circuit diagram illustrating current flows of the driving circuit according to Embodiment 1 when a switching element is ON.

FIG. 9A is a circuit diagram illustrating current flows of the driving circuit according to Embodiment 2 when a switching element is ON.

FIG. 15A is a circuit diagram illustrating current flows of the driving circuit according to Embodiment 3 when a switching element is ON.

DESCRIPTION OF EMBODIMENTS

A driving circuit, an illumination light source, and an illumination device according to Embodiments of the present invention will be described with reference to the drawings. Embodiments to be described below are preferred embodiments of the present invention. The values, shapes, materials, constituent elements, and positions and connections of the constituent elements indicated in Embodiment are examples, and do not limit the present invention. The constituent elements in Embodiments that are not described in independent Claims that describe the most generic concept of the present invention are described as arbitrary constituent elements.

Embodiment 1

Configuration of Driving Circuit

Figure 1:
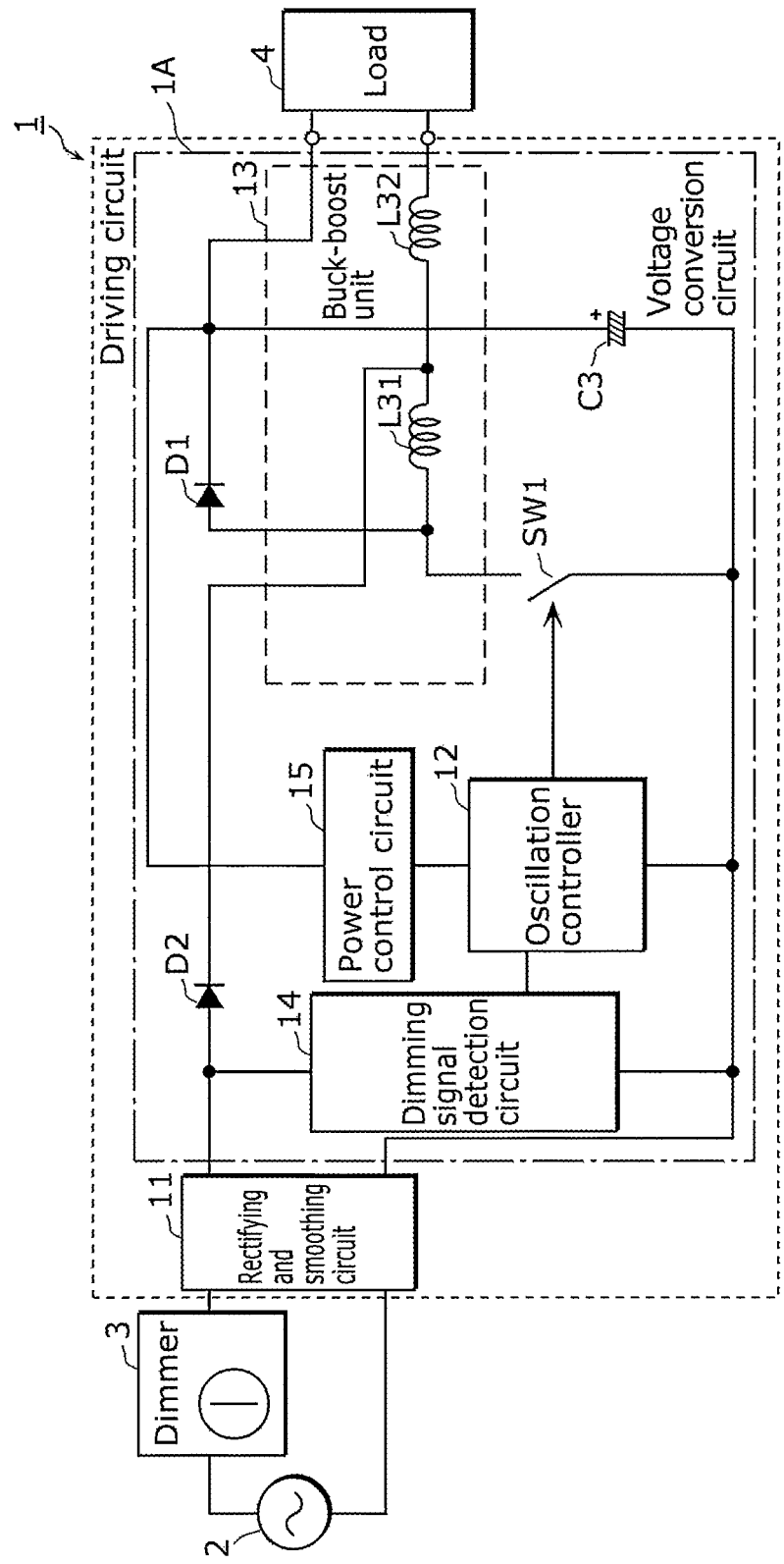
FIG. 1 is a block diagram of a driving circuit according to Embodiment 1.

FIG. 1 is a block diagram of a driving circuit according to Embodiment 1. As illustrated in FIG. 1, a driving circuit 1 according to Embodiment 1 includes a rectifying and smoothing circuit 11 connected to an AC power supply 2 and a dimmer 3, and a voltage conversion circuit 1A connected to high-potential and low-potential output terminals of the rectifying and smoothing circuit 11. The driving circuit 1 is a driving circuit that converts a phase-controlled AC signal into a DC signal according to a dimming level, and causes a light-emitting device to emit light using the DC signal.

The voltage conversion circuit 1A includes an oscillation controller 12 that controls a switching operation of a switching element SW1, a dimming signal detection circuit 14 that applies a dimming signal voltage to the oscillation controller 12, a power control circuit 15 that stably supplies power to the oscillation controller 12, and a buck-boost unit 13.

The output terminals of the voltage conversion circuit 1A are connected to a load 4 that is, for example, an LED light-emitting device. The voltage across the load 4 is a constant value defined according to the number of LEDs that are connected in series. This feature is different from that of a load having a resistive impedance, such as a fluorescent lamp.

The AC power supply 2 outputs, for example, an AC voltage of 100 V rms. The dimmer 3 for adjusting the luminance of the light-emitting module is connected between the AC power supply 2 and the rectifying and smoothing circuit 11.

The dimmer 3 is a phase control dimmer that converts the AC signal supplied from the AC power supply 2 into a dimming signal that is a signal having partially clipped AC voltage waveforms. This dimmer 3 phase-controls the AC signal according to the dimming level to obtain the dimming signal. More specifically, the dimmer 3 converts the input AC signal into the dimming signal that is a signal indicating a zero voltage at a phase-controlled angle corresponding to the dimming level.

The load 4 is, for example, a light-emitting device, such as an LED module. The LED module is a set of LED chips mounted on one side of a mounting board, and emits light of a brightness corresponding to the current supplied from the driving circuit 1. In other words, the LED module emits light at a luminance corresponding to the current supplied from the driving circuit 1. The load 4 is, for example, a light-emitting module including several tens of LEDs that are connected in series. When such a light-emitting module has a rated voltage of 140 V or higher, the voltage conversion circuit 1A needs to boost the voltage supplied from the AC power supply 2. The load 4 may be a light-emitting device other than an LED, for example, a semiconductor laser, organic EL elements, and inorganic EL elements.

The detailed configuration of the driving circuit 1 will be described hereinafter.

Figure 2:
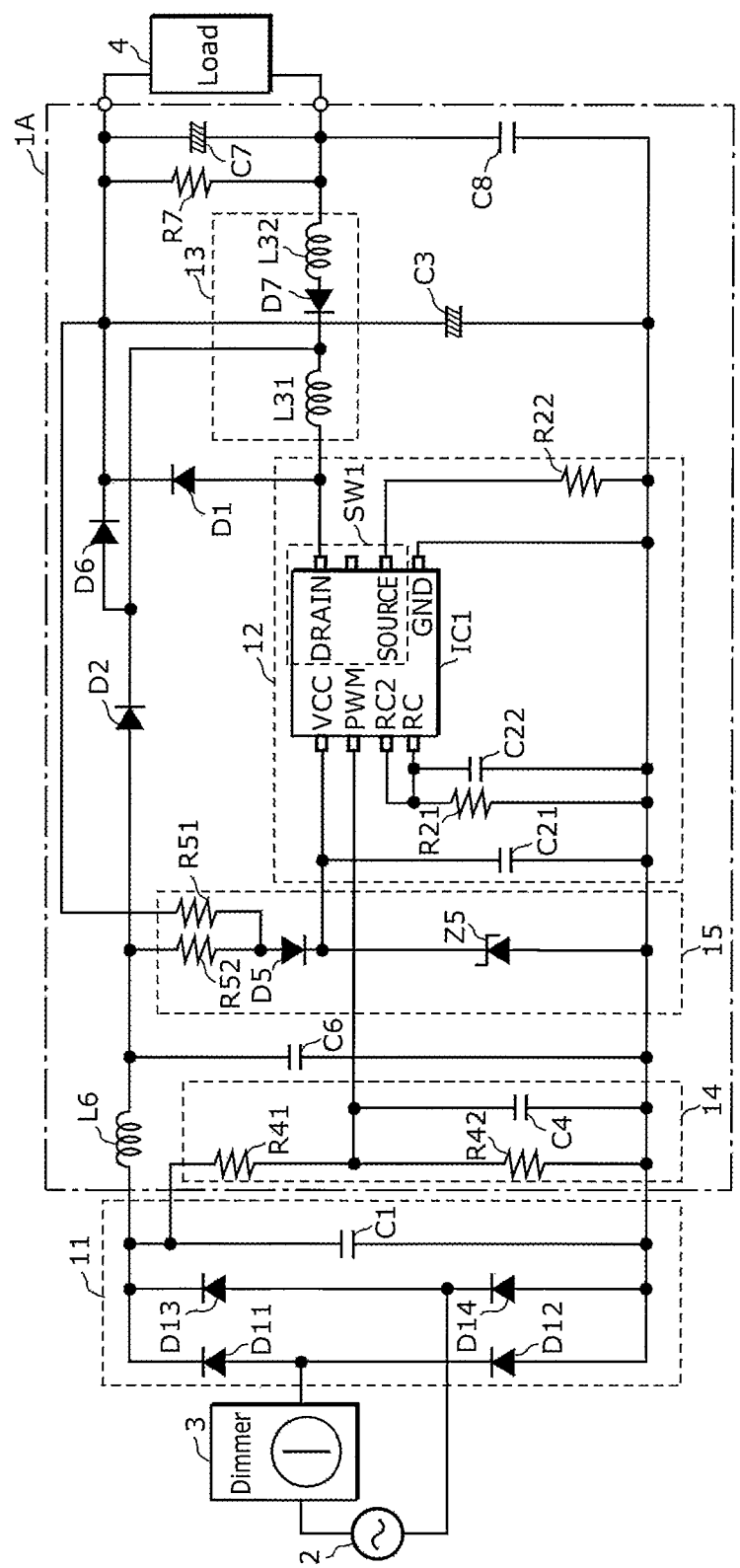
FIG. 2 is a circuit diagram of the driving circuit according to Embodiment 1.

FIG. 2 is a circuit diagram of the driving circuit 1 according to Embodiment 1.

(1) Rectifying and Smoothing Circuit 11

The rectifying and smoothing circuit 11 includes a rectifying circuit and a capacitor C1. The rectifying circuit includes a diode bridge of four diodes D11 to D14. The capacitor C1 is coupled between output terminals of the diode bridge, and smoothes the rectified AC voltage. The capacitor C1 is, for example, an electrolytic capacitor. Furthermore, the capacitor C1 is for example, a high dielectric ceramic capacitor or a film capacitor.

(2) Voltage Conversion Circuit 1A

The voltage conversion circuit 1A includes the switching element SW1 included in an IC 1, inductors L31 and L32 included in the buck-boost unit 13, diodes D1 and D2, capacitors C3 and C7, and a resistor element R22, in addition to the oscillation controller 12, the dimming signal detection circuit 14, and the power control circuit 15. The voltage conversion circuit 1A has a buck-boost function with these circuit elements.

The switching element SW1 is, for example, a metal-oxide-semiconductor field-effect transistor (MOSFET) of N channel. The switching element SW1 has (i) a source connected to the low-potential output terminal of the rectifying and smoothing circuit 11 through the resistor element R22, and (ii) a drain connected to the inductor L31. The switching element SW1 determines ON/OFF timings according to the dimming signal voltage supplied to the pulse-width modulation (PWM) terminal of the IC 1.

The diode D2 is a first diode having an anode connected to the high-potential output terminal of the rectifying and smoothing circuit 11 through the inductor L6, and a cathode connected to a connecting point between the inductors L31 and L32. The diode D2 has a function of preventing backflow of the current from the connecting point to the capacitor C1 when the connecting point has a potential higher than that of the capacitor C1.

The resistor element R22 detects a drain current flowing through the switching element SW1, based on the voltage across the resistor element R22.

The inductor L31 is a first inductor having one end connected to the cathode of the diode D2, and another end connected to the drain of the switching element SW1. Furthermore, another end of the inductor L31 is connected to the inductor L32 through the diode D7.

The inductor L32 is a second inductor having one end connected to the inductor L31, and another end connected to a low-potential terminal of the load 4.

The diode D1 is a second diode having an anode connected to the one end of the inductor L31 and the drain of the switching element SW1, and a cathode connected to a high-potential terminal of the capacitor C3.

The capacitor C3 has the high-potential terminal connected to the cathode of the diode D1, to the high-potential terminal of the load 4, and to an input terminal of the power control circuit 15, and the low-potential terminal connected to the low-potential output terminal of the rectifying and smoothing circuit 11. The capacitor C3 is a first capacitor that is charged by receiving the magnetic energy from the inductor L31 when the switching element SW1 is OFF and discharges to the load 4 when the switching element SW1 is ON.

The capacitor C7 has one end connected to the cathode of the diode D1, and another end connected to the other end of the inductor L32.

The voltage conversion circuit 1A having such a configuration outputs a voltage across the capacitor C7 to the load 4 connected in parallel with the capacitor C7.

(3) Oscillating Controller 12

The oscillation controller 12 supplies a pulse signal having rectangular voltage waveform for driving the switching element SW1 under the PWM control (hereinafter referred to as "PWM signal") to a gate that is the control terminal of the switching element SW1.

The oscillation controller 12 includes, for example, the IC 1 including the switching element SW1. The IC 1 includes a power supply terminal VCC, a grounding terminal GND, a dimming signal input terminal PWM, regulating terminals RC and RC2, and a drain terminal DRAIN and a source terminal SOURCE of the switching element SW1. The power supply terminal VCC is connected to the power control circuit 15.

The oscillation controller 12 inputs the PWM signal to the gate of the switching element SW1. Then, the oscillation controller 12 modulates the pulse width of the PWM signal so that the drain current flowing through the switching element SW1 is constant. When the pulse width of the PWM signal is modulated, the percentage of one period in which the gate voltage of the switching element SW1 is maintained higher than or equal to the turn-on voltage of the switching element SW1, that is, the percentage of one period in which the switching element SW1 is maintained ON (hereinafter referred to as "duty ratio") is changed. As such, the oscillation controller 12 drives the switching element SW1 under the constant current control.

(4) Power Control Circuit 15

The power control circuit 15 is a circuit that stably supplies a supply voltage to the oscillation controller 12 that controls ON/OFF timings of the switching element SW1, and is connected to the one end of the capacitor C3 through the resistor element R51, and to the anode of the diode D2 through the resistor element R52. The resistor element R51 is a first resistor element having one end connected to the high-potential terminal of the capacitor C3 and another end connected to the power supply terminal VCC of the oscillation controller 12. Furthermore, the resistor element R52 is a second resistor element having one end connected to the high-potential output terminal of the rectifying and smoothing circuit 11 and another end connected to the power supply terminal VCC of the oscillation controller 12.

With the configuration, the power control circuit 15 can be supplied with power from the high-potential output terminal of the rectifying and smoothing circuit 11 via the resistor element R52, and from the voltage conversion circuit 1A through the resistor element R51. In other words, the power control circuit 15 applies the voltage corresponding to a voltage at the high-potential terminal of the capacitor C3 to the oscillation controller 12 as a supply voltage for driving the oscillation controller 12. The advantage of supplying power through the resistor element R51 will be described hereinafter.

When the dimmer 3 converts the input AC voltage for the rectifying and smoothing circuit 11, for example, in the leading edge mode or the trailing edge mode, the voltage at the anode of the diode D2 extremely fluctuates according to the dimming level, and depends on the time. Furthermore, the voltage at the cathode of the diode D2 extremely fluctuates according to ON or OFF of the switching element SW1 under the PWM control. In light of these aspects, the power control circuit 15 is connected to one end of the capacitor C3 that can stably supply a voltage even when the dimmer 3 converts the voltage according to Embodiment 1. Since the voltage is stably supplied to the power supply terminal VCC in the oscillation controller 12, the switching element SW1 can be stably oscillated for an entire period.

Furthermore, a Zener diode Z5 has an anode connected to the power supply terminal VCC, and a cathode connected to the low-potential output terminal of the rectifying and smoothing circuit 11. This configuration can prevent the power supply terminal VCC from having the input voltage higher than or equal to a predetermined voltage.

The resistor elements R51 and R52 do not have to be included in the power control circuit 15, and may be replaced with simple lines. Furthermore, a diode may be disposed in the power control circuit 15 to prevent the backflow of the current to the capacitor C1 through the resistor element R52. Furthermore, the resistor element R51 may be connected to the cathode of the diode D5. Furthermore, the resistor element R51 may be a series regulator. Furthermore, the resistor element R51 may be replaced with a simple line. The configuration of the resistor elements R51 and R52 herein holds true for Embodiments other than Embodiment 1.

(5) Dimming Signal Detection Circuit 14

The dimming signal detection circuit 14 is a circuit that detects a dimming level and controls the PWM signal of the oscillation controller 12. The resistor elements R41 and R42 that are connected in series are connected in parallel with the capacitor C1. Furthermore, the resistor element R42 and the capacitor C4 are connected in parallel between the dimming signal input terminal PWM and the low-potential output terminal of the rectifying and smoothing circuit 11. The resistor element R41 is a third resistor element having one end connected to the high-potential output terminal of the rectifying and smoothing circuit 11 and another end connected to the dimming signal input terminal PWM of the oscillation controller 12, whereas the resistor element R42 is a fourth resistor element having one end connected to the dimming signal input terminal PWM and another end connected to the low-potential output terminal of the rectifying and smoothing circuit 11. Furthermore, the capacitor C4 is a third capacitor having one end connected to the dimming signal input terminal PWM and another end connected to the low-potential output terminal of the rectifying and smoothing circuit 11.

This configuration allows the voltage of the capacitor C1 to be divided into voltages for the resistor elements R41 and R42, and the voltage smoothed by the capacitor C4 to be applied to the dimming signal input terminal PWM of the oscillation controller 12. In other words, application of the voltage to the dimming signal input terminal PWM enables the PWM control according to the dimming level.

[Operation of Driving Circuit]

Next, operations of the driving circuit 1 according to Embodiment 1 will be described.

Figure 3A:
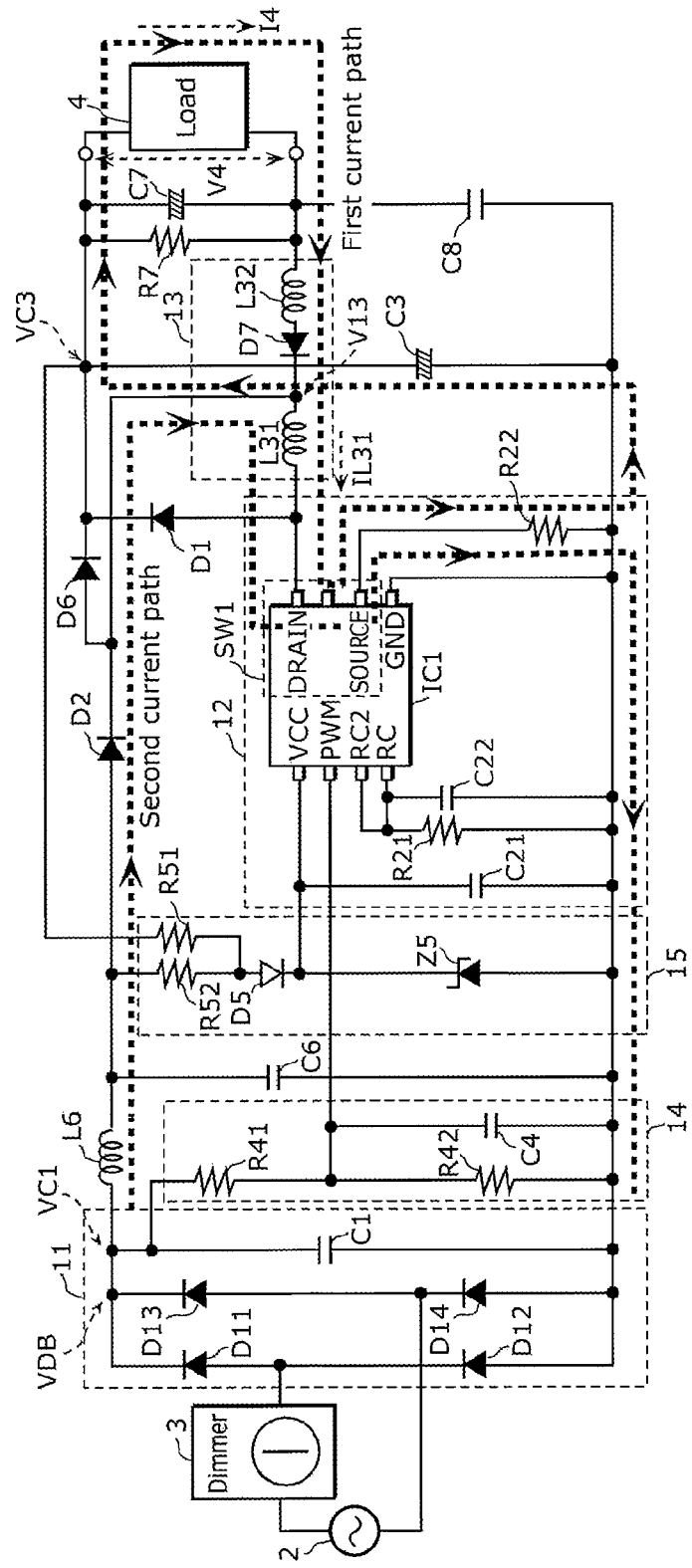
Figure 3B:
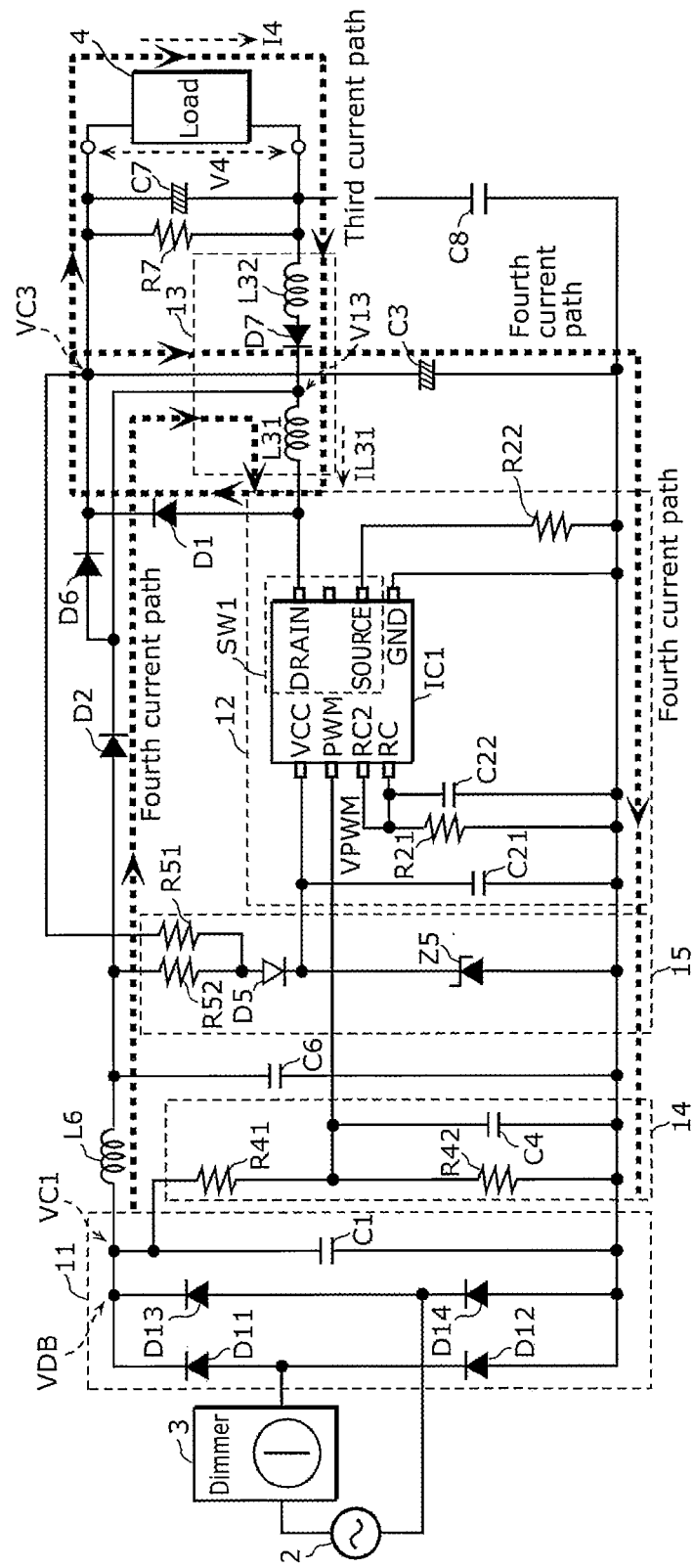
FIG. 3B is a circuit diagram illustrating current flows of the driving circuit according to Embodiment 1 when the switching element is OFF.

FIG. 3A is a circuit diagram illustrating current flows of the driving circuit 1 according to Embodiment 1 when the switching element SW1 is ON. FIG. 3B is a circuit diagram illustrating current flows of the driving circuit 1 when the switching element SW1 is OFF.

As illustrated in FIG. 3A, when the switching element SW1 is ON (first state), a current flows through a path from the capacitor C3, the load 4, the inductor L32, the inductor L31, and the switching element SW1 to the resistor element R22, and then back to the capacitor C3 (hereinafter referred to as "first current path"). This first current path equates to a discharging path of the capacitor C3.

Simultaneously, a current flows through a path from the high-potential output terminal of the rectifying and smoothing circuit 11, the connecting point between the inductors L31 and L32, and the switching element SW1 to the resistor element R22, and then back to the low-potential output terminal of the rectifying and smoothing circuit 11 (hereinafter referred to as "second current path"). Here, the connecting point between the inductors L31 and L32 has a potential equivalent to the potential of the cathode of the diode D2. The potential is lower than the potential of the high-potential output terminal of the rectifying and smoothing circuit 11 by the turn-on voltage VD2 of the diode D2.

In the first state, magnetic energy is stored in (i) the inductors L31 and L32 by discharging the capacitor C3 through the first current path, and simultaneously in (ii) the inductor L31 with a current flowing from the high-potential output terminal of the rectifying and smoothing circuit 11 through the second current path.

As illustrated in FIG. 3B, when the switching element SW1 is OFF (second state), a current flows through a path from the inductors L32 and L31 to the diode D1 and the load 4 and then back to the inductors L32 and L31 (hereinafter referred to as "third current path").

Simultaneously, a current flows through a path from the high-potential output terminal of the rectifying and smoothing circuit 11, the inductor L31, and the diode D1 to the capacitor C3, and then back to the low-potential output terminal of the rectifying and smoothing circuit 11 (hereinafter referred to as "fourth current path"). The current flowing through the fourth current path is interrupted when charging of the capacitor C3 is completed. This fourth current path equates to a charging path of the capacitor C3.

In the second state, magnetic energy stored in the inductors L31 and L32 is discharged to the capacitor C3 with the current flowing through the fourth current path, and to the load 4 with the current flowing through the third current path.

Upon completion of discharging of the magnetic energy stored in the inductors L31 and L32, the current flowing from the high-potential output terminal of the rectifying and smoothing circuit 11 to the diode D2 is interrupted.

In the driving circuit 1, the voltage at the connecting point between the inductors L31 and L32 when the currents flow through the first current path and the second current path (first voltage) is equal to the voltage at the connecting point when the currents flow through the third current path and the fourth current path (second voltage). More specifically, the duty ratio of the switching element SW1 is set based on the voltage across the load 4, the number of turns of the inductors L31 and L32, and a turns ratio of the inductor L31 to the inductor L32. Furthermore, the voltage at the connecting point between the inductors L31 and L32 is set lower than the output voltage of the rectifying and smoothing circuit 11 by the turn-on voltage VD2 of the diode D2 (hereinafter referred to as "threshold voltage"). Accordingly, the current continues to flow from the rectifying and smoothing circuit 11 to the voltage conversion circuit 1A as long as the current flows through the inductors L31 and L32.

Figure 4:
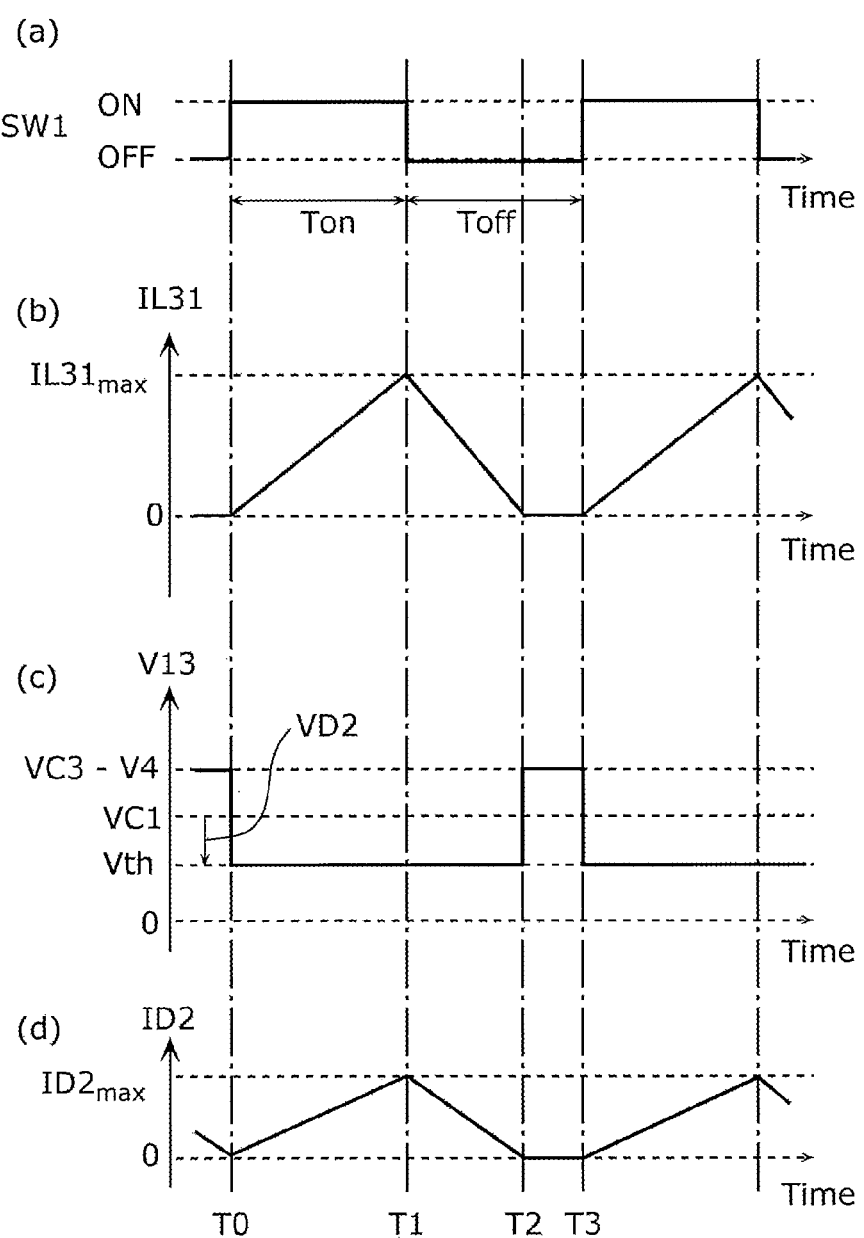
FIG. 4 indicates current and voltage waveform charts of a portion of a voltage conversion circuit according to Embodiment 1 when the switching element is turned ON or OFF.

FIG. 4 indicates current and voltage waveform charts of a portion of the voltage conversion circuit 1A according to Embodiment 1 when the switching element SW1 is turned ON or OFF. More specifically in FIG. 4, (a) indicates the ON and OFF operations of the switching element SW1, (b) indicates a time response waveform of a current IL31 flowing through the inductor L31, (c) indicates a time response waveform of a voltage V13 at the connecting point between the inductors L31 and L32, and (d) indicates a time response waveform of a current ID2 flowing through the diode D2.

At a time T0 when the switching element SW1 is ON, the current IL31 starts to flow from the capacitor C3 through the inductors L31 and L32 via the load 4.

Then, during a period from the time T0 to a time T1 when the switching element SW1 is ON, the current IL31 gradually increases. Here, one terminal of the inductor L31 that is closer to the load 4 has a potential higher than the other terminal thereof connected to the switching element SW1. Furthermore, one terminal of the inductor L32 that is connected to the load 4 has a potential higher than the other terminal thereof that is closer to the switching element SW1. The voltage V13 at the connecting point between the inductors L31 and L32 is maintained as the voltage Vth (hereinafter referred to as "threshold voltage") that is lower than the voltage VC1 across the capacitor C1 by the turn-on voltage VD2 of the diode D2. Furthermore, the current flowing through the inductor L31 from the high-potential output terminal of the rectifying and smoothing circuit 11 through the diode D2 also gradually increases.

Next, when the switching element SW1 is OFF at the time T1, the magnetic energy stored in the inductors L31 and L32 starts to discharge. Accordingly, the current IL31 flowing through the inductors L31 and L32 starts to decrease.

During a period between the times T1 and T2, the voltage V13 is maintained as the voltage Vth that is lower than the voltage VC1 by the turn-on voltage VD2. Furthermore, the current ID2 flowing from the high-potential output terminal of the rectifying and smoothing circuit 11, the diode D2, and the inductor L31 to the capacitor C3 gradually decreases as the capacitor C3 is being charged.

Next, when all the magnetic energy stored in the inductors L31 and L32 is discharged at the time T2, the current IL31 stops flowing.

During a period between the times T2 and T3, the voltage V13 is maintained as a predetermined voltage as long as the switching element SW1 is OFF. The voltage V13 during this period is a voltage lower than the voltage VC3 of the capacitor C3 through which no current flows, by a voltage drop V4 at the load 4.

Then, at the time T3 when the switching element SW1 becomes again ON, the current starts to flow from the capacitor C3 to the inductors L31 and L32 through the load 4 (after the time T3). Subsequently, the phenomenon is repeated according to the ON and OFF operations of the switching element SW1.

Next, the voltage and current waveforms of each of the constituent elements in the voltage conversion circuit 1A for each cycle of an input AC power will be described.

Figure 5A:
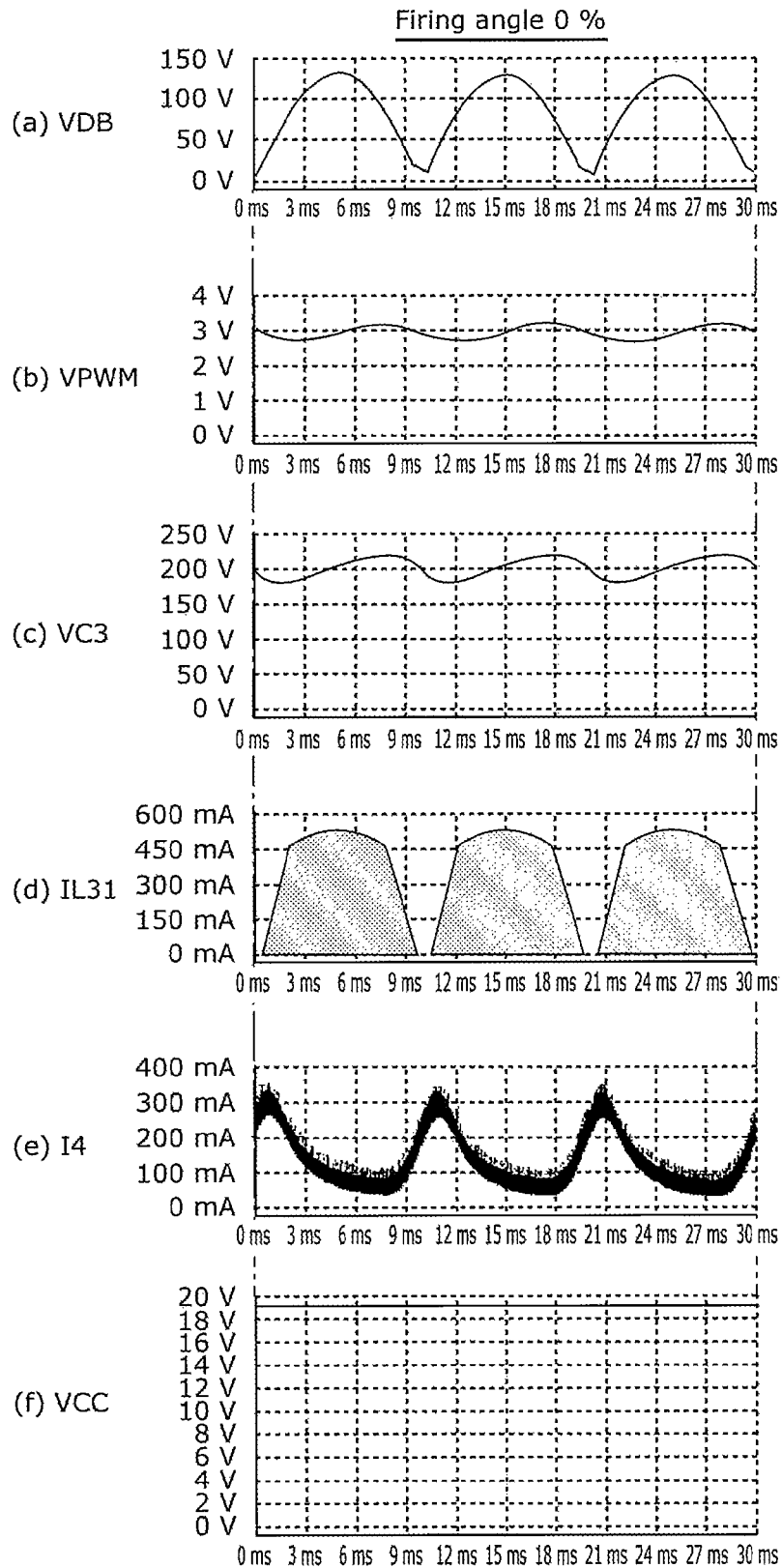
FIG. 5A indicates current and voltage waveform charts of a portion of the voltage conversion circuit according to Embodiment 1 when a firing angle in a leading edge mode is 0%.
Figure 5B:
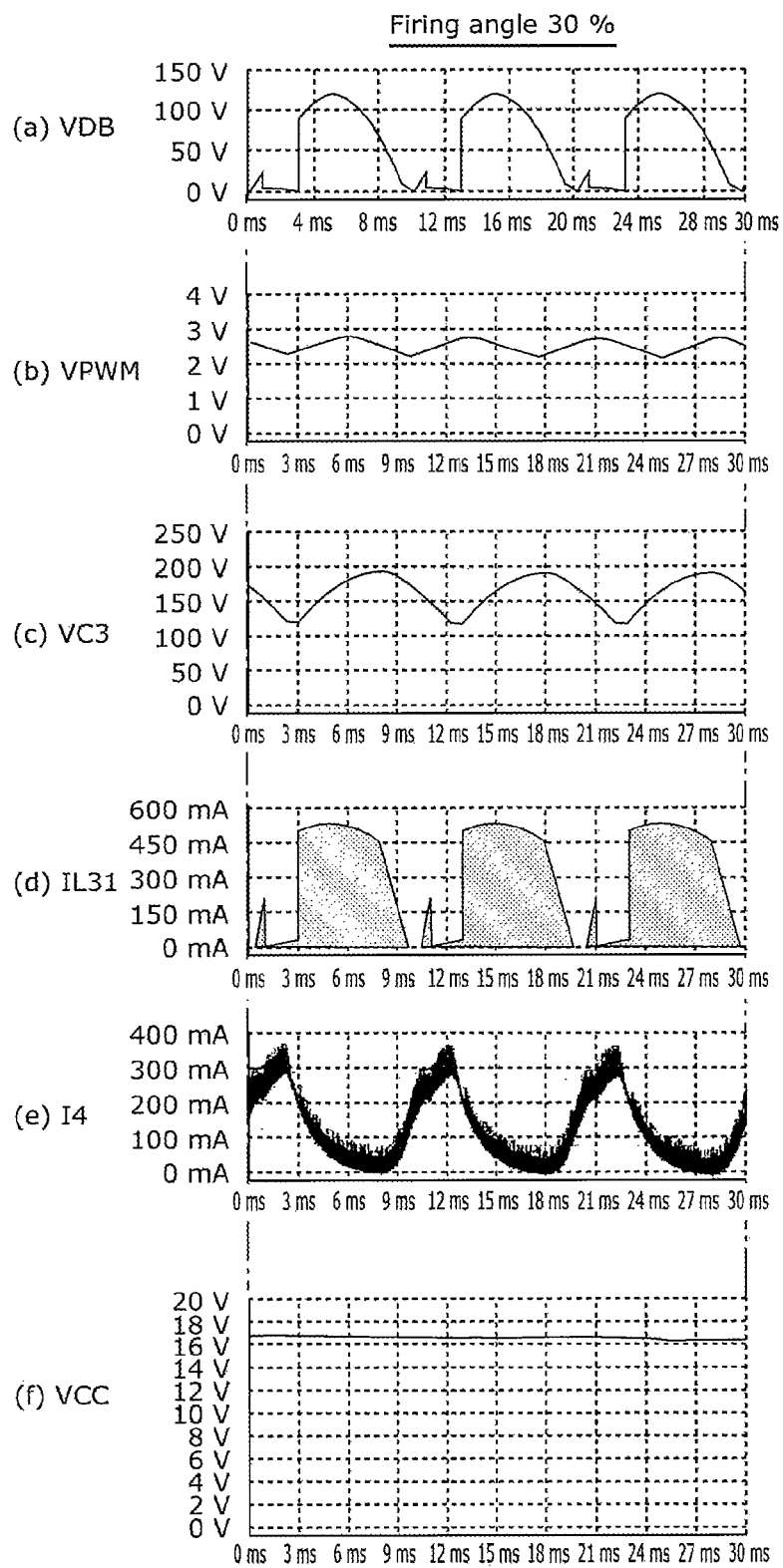
FIG. 5B indicates current and voltage waveform charts of a portion of the voltage conversion circuit according to Embodiment 1 when the firing angle in the leading edge mode is 30%.
Figure 5C:
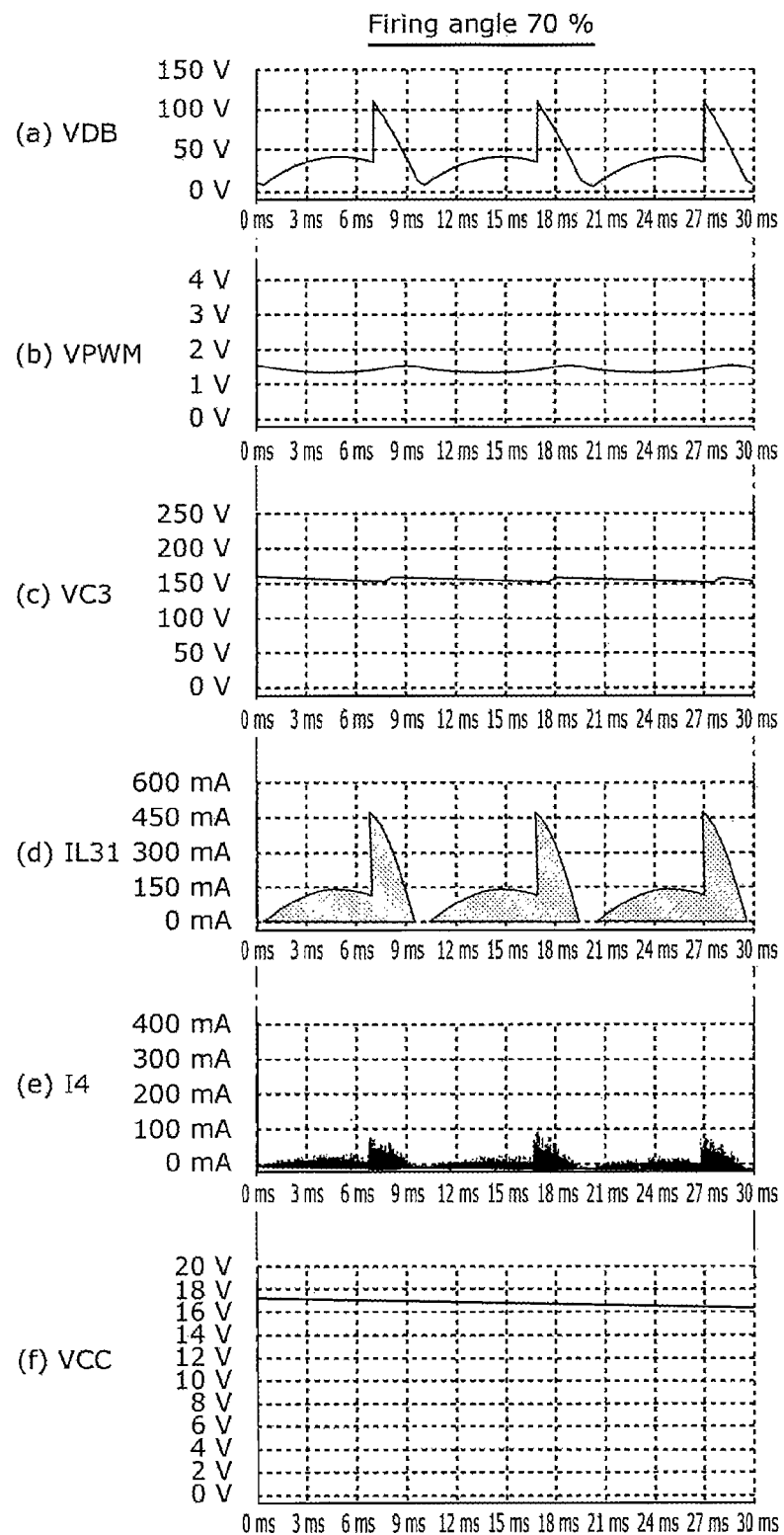
FIG. 5C indicates current and voltage waveform charts of a portion of the voltage conversion circuit according to Embodiment 1 when the firing angle in the leading edge mode is 70%.

FIG. 5A indicates current and voltage waveform charts of each of the constituent elements in the voltage conversion circuit 1A according to Embodiment 1 when a firing angle in a leading edge mode is 0%. FIG. 5B indicates current and voltage waveform charts of each of the constituent elements in the voltage conversion circuit 1A according to Embodiment 1 when the firing angle in the leading edge mode is 30%. FIG. 5C indicates current and voltage waveform charts of each of the constituent elements in the voltage conversion circuit 1A according to Embodiment 1 when the firing angle in the leading edge mode is 70%.

Here, dimming waveforms in each of the leading edge mode and the trailing edge mode will be described. The dimmer 3 generates through, for example, the diode bridge, a diode bridge output voltage VDB illustrated by waveforms of (a) of FIG. 5A, (a) of FIG. 5B, and (a) of FIG. 5C. As in the drawings, the dimmer 3 generates a dimming signal by setting the voltage of the input AC signal to almost 0 V at a phase-controlled angle corresponding to the specified dimming level. More specifically, the voltage is set to almost 0V in a range from a phase angle of 0 degree of a phase at which the AC voltage is 0 V (also called zero crossing) to a phase angle corresponding to the specified dimming level. Then, the voltage of the dimming signal is increased to the voltage of the AC signal supplied from the AC power supply 2, at the phase angle corresponding to the specified dimming level. The phase angle at which the dimmer 3 fires the dimming signal is referred to as a firing angle.

The dimming signal generated by the dimmer 3 is not limited to a leading-edge signal representing the AC signal whose start is delayed according to the dimming level as illustrated in (a) of FIG. 5A, (a) of FIG. 5B, and (a) of FIG. 5C. More specifically, the dimming signal has only to be a phase-controlled dimming signal, for example, a trailing-edge signal. The signal may be any, for example, a signal compatible with the leading edge mode and the trailing edge mode, or signals obtained by changing the amplitude, supplying DC power and changing the voltage level, and applying a voltage under the PWM control. Each of FIG. 5A, FIG. 5B, and FIG. 5C illustrates waveforms of 1.5 cycles of input AC electric power.

The input voltage from the AC power supply 2 to the dimmer 3 has a sinusoidal waveform. Furthermore, the input voltage from the dimmer 3 to the rectifying and smoothing circuit 11 has also a sinusoidal waveform having a leading edge. Furthermore, the output voltage VDB of the diode bridge of the rectifying and smoothing circuit 11 has waveforms illustrated in (a) of FIG. 5A, (a) of FIG. 5B, and (a) of FIG. 5C when the firing angle is 0%, 30%, and 70%, respectively.

Next, the dimming signal detection circuit 14 applies to the dimming signal input terminal PWM of the IC 1 a dimming signal voltage VPWM obtained by dividing and smoothing the voltage VC1 of the capacitor C1. The dimming signal voltage VPWM has waveforms as illustrated in (b) of FIG. 5A, (b) of FIG. 5B, and (b) of FIG. 5C when the firing angle is 0%, 30%, and 70%, respectively. The dimming signal voltage VPWM is smoother than the output voltage VDB of the diode bridge, and is lower as the firing angle is larger.

Next, the voltage VC3 of the capacitor C3 has pulsating temporal waveforms as illustrated in (c) of FIG. 5A, (c) of FIG. 5B, and (c) of FIG. 5C, and is maintained higher than or equal to a predetermined voltage value (for example, 100 V). Accordingly, the power control circuit 15 can stably supply the voltage VC3 to the power supply terminal VCC of the IC 1 for an entire period.

Here, when an absolute value Vs of the input AC voltage is higher than or equal to the threshold voltage Vth that is the voltage V13 at the connecting point between the inductors L31 and L32, that is, when a current flows through the inductors L31 and L32, the diode D2 is conducting, and the current continues to flow from the high-potential output terminal of the rectifying and smoothing circuit 11 to the voltage conversion circuit 1A. Accordingly, the current flows through the diode bridge DB included in the rectifying and smoothing circuit 11, and through the rectifying and smoothing circuit 11 from the AC power supply 2. When the voltage V13 is equal to a voltage lower than the voltage VC3 across the capacitor C3 by the voltage drop V4 at the load 4 (VC3−V4), that is, when the current does not flow through the inductors L31 and L32, the diode D2 is nonconducting, and the current from the high-potential output terminal of the rectifying and smoothing circuit 11 to the voltage conversion circuit 1A is interrupted. In other words, the current flows from the high-potential output terminal of the rectifying and smoothing circuit 11 to the connecting point between the inductors L31 and L32, in synchronization with the ON and OFF of the switching element SW1.

Furthermore, when the absolute value Vs of the input AC voltage is lower than the threshold voltage Vth, the diode D2 continues to be nonconducting, and the current flowing from the AC power supply 2 to the voltage conversion circuit 1A through the rectifying and smoothing circuit 11 is completely interrupted.

The current IL31 flowing through the inductors L31 and L32 has respective waveforms illustrated in (d) of FIG. 5A, (d) of FIG. 5B, and (d) of FIG. 5C. In each of the drawings, a period corresponding to the half cycle of the input AC voltage has both a period during which the current IL31 flows in synchronization with the ON and OFF operations of the switching element SW1 and a period during which the current IL31 flowing from the AC power supply 2 to the rectifying and smoothing circuit 11 is interrupted. Furthermore, the period during which the current IL31 flows continues after the absolute value Vs of the input AC voltage in the half cycle of the input AC voltage reaches its maximum, when the firing angle is any one of 0%, 30%, and 70%. This shows that the current flows from the AC power supply 2 to the rectifying and smoothing circuit 11 during the period. Accordingly, the power factor herein can be more improved than that of the conventional configuration having no period during which a current flows from the AC power supply 2 to the rectifying and smoothing circuit 11 after the absolute value Vs of the input AC voltage reaches its maximum. Actually, the power factor in the conventional configuration having no period during which a current flows from the AC power supply 2 to the rectifying and smoothing circuit 11 after the absolute value Vs of the input AC voltage reaches its maximum (hereinafter referred to as "configuration according to comparative example") approximately ranges from 0.56 to 0.61, whereas the power factor of the driving circuit 1 according to Embodiment 1 can be increased to 0.8 or higher.

(e) of FIG. 5A, (e) of FIG. 5B, and (e) of FIG. 5C illustrate waveforms of a current I4 flowing through the load 4. The waveforms show that the current I4 flows according to each dimming level. Since the capacitance of the capacitor C7 is set smaller to simplify the operation, the current I4 exhibits dynamic pulsating flow. In contrast, when the capacitance of the capacitor C7 is set larger, the current I4 can be set to a DC with less temporal fluctuation.

Finally, (f) of FIG. 5A, (f) of FIG. 5B, and (f) of FIG. 5C illustrate waveforms of the voltage VCC of the power supply terminal VCC of the IC 1. As described above, the power control circuit 15 that applies a supply voltage to the power supply terminal VCC generates the voltage VCC with respect to the voltage V3 of the capacitor C3. The waveforms show that the voltage VCC is stable over the AC power period and the switching period. In other words, the supply voltage VCC for driving the switching element SW1 can be secured from the capacitor C3 of the voltage conversion circuit 1A.

Figure 6A:
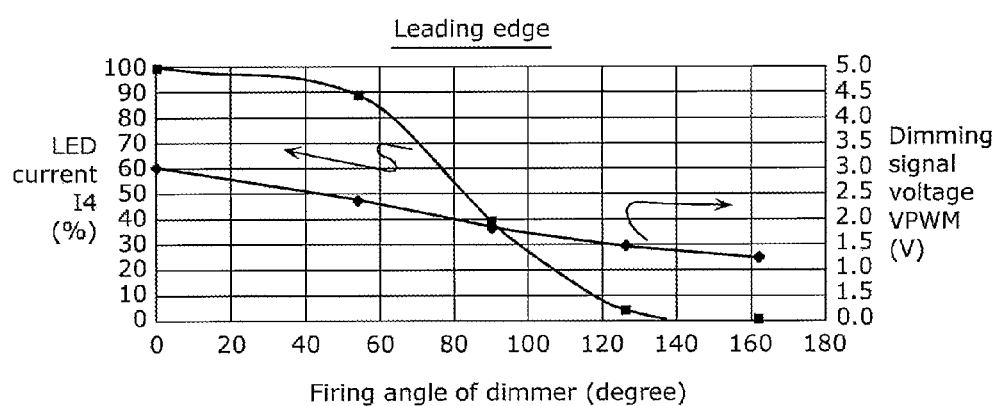
FIG. 6A graphs a relationship between (i) an LED current and a dimming signal voltage that are generated by the driving circuit according to Embodiment 1 and (ii) the firing angle in the leading edge mode.

FIG. 6A graphs a relationship between (i) the LED current and the dimming signal voltage that are generated by the driving circuit 1 according to Embodiment 1 and (ii) the firing angle in the leading edge mode. FIG. 6A shows that the dimming signal voltage and the current I4 of the load 4 that is an LED smoothly decrease without any malfunction of the dimmer 3 as the firing angle increases.

Figure 6B:
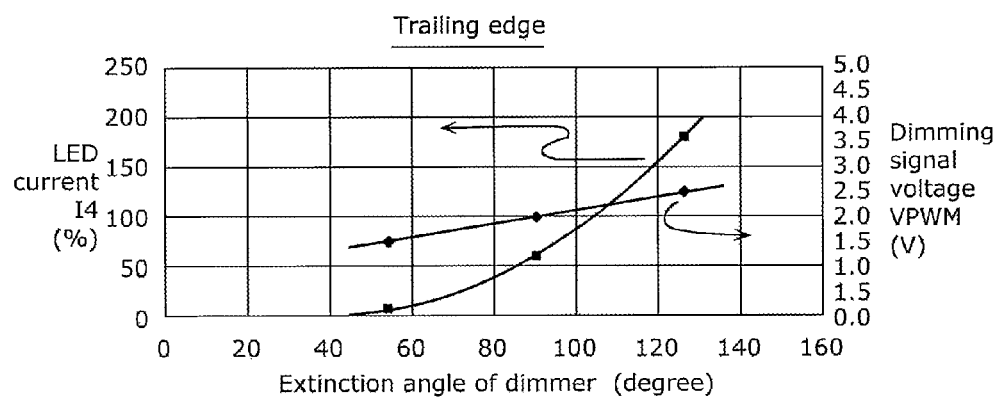
FIG. 6B graphs a relationship between (i) an LED current and a dimming signal voltage that are generated by the driving circuit according to Embodiment 1 and (ii) the firing angle in a trailing edge mode.

Furthermore, FIG. 6B graphs a relationship between (i) the LED current and the dimming signal voltage that are generated by the driving circuit 1 according to Embodiment 1 and (ii) an extinction angle in the trailing edge mode. FIG. 6B shows that the dimming signal voltage smoothly increases and the current I4 of the load 4 that is an LED smoothly increases without any malfunction of the dimmer 3 as the extinction angle increases.

Conventionally, the supply voltage VCC for driving the switching element SW1 can be secured from the output terminals of the rectifying and smoothing circuit 11 or the cathode of the diode D2. Since the potential of the output terminals of the rectifying and smoothing circuit 11 or the cathode of the diode D2 extremely decreases according to the dimming level or strongly depends on the time, the supply voltage fluctuates and the switching operation cannot be stabilized. Thus, it is feared that abrupt change in luminance or flicker may occur in the higher and lower luminance regions. In contrast, since the driving circuit 1 according to Embodiment 1 secures the supply voltage from the capacitor C3 of the voltage conversion circuit 1A, it can obtain the excellent properties as indicated in FIGS. 6A and 6B. Conventionally, when the dimmer 3 is OFF, the leakage current flows from the dimmer 3. However, since no input current flows to the lamp (the load 4), the output voltage of the dimmer 3 may increase to a higher voltage over, for example, 50 V. This output voltage causes the control circuit of the dimmer 3 to malfunction and the lamp to flicker. In contrast, since the input current to the lamp flows almost for the entire period in the driving circuit 1 according to Embodiment 1, the output terminal voltage of the dimmer 3 can be maintained as a voltage lower than or equal to 50 V even when the switching element SW1 is OFF. Accordingly, the smooth dimming properties can be obtained with no malfunction of the dimmer 3 and no flicker of the lamp.

In summary of the operations of the driving circuit 1 according to Embodiment 1, when the switching element SW1 is ON (first state), the capacitor C3 discharges and simultaneously, magnetic energy is stored in the inductor L31 with a current flowing from the rectifying and smoothing circuit 11 to the inductor L31 through the diode D2. When the switching element SW1 is OFF (second state), the magnetic energy stored in the inductor L31 is discharged to the capacitor C3, and simultaneously, a current flows from the rectifying and smoothing circuit 11 to the inductor L31 through the diode D2 to compensate for the energy discharged from the inductor L31. The driving circuit 1 alternates between the operations in the first and second states.

Accordingly, the driving circuit 1 according to Embodiment 1 can extend a period during which a current flows from the AC power supply 2 to the voltage conversion circuit 1A through the rectifying and smoothing circuit 11. Furthermore, the supply voltage VCC for driving the switching element SW1 can be secured from the capacitor C3 of the voltage conversion circuit 1A. Accordingly, the driving circuit 1 can improve the power factor and suppress abrupt change in luminance in the dimming. According to Embodiment 1, one of the diode D7 and the inductor L32 may be eliminated. The inductor L32 functions as a step-down chopper that applies energy from the capacitor C3 to the load 4. Accordingly, a controlled current continues to flow through the load 4. Furthermore, the diode D7 merely momentarily interrupts the current to the load 4, and thus, is unnecessary depending on the setting of the inductor L32. Furthermore, the diode D6 is disposed to accelerate the start-up of the voltage conversion circuit 1A at the initial stage. Accordingly, the voltage conversion circuit 1A can expedite the supply of power to the load 4 at the initial stage.

Embodiment 2

Configuration of Driving Circuit

Figure 7:
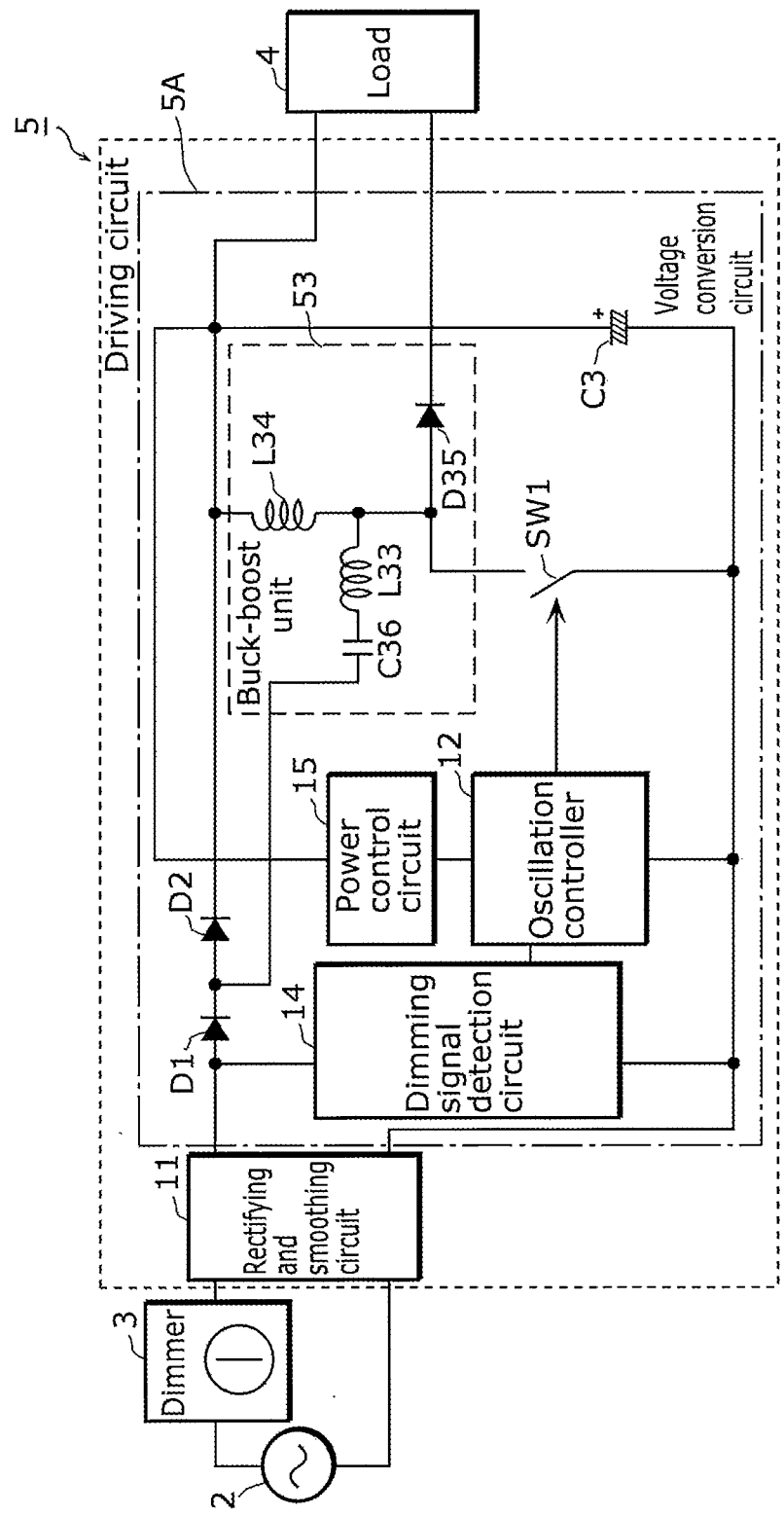
FIG. 7 is a block diagram of a driving circuit according to Embodiment 2.

FIG. 7 is a block diagram illustrating a driving circuit 5 according to Embodiment 2. As illustrated in FIG. 7, the driving circuit 5 according to Embodiment 2 includes a rectifying and smoothing circuit 11 connected to an AC power supply 2 and a dimmer 3, and a voltage conversion circuit 5A connected to high-potential and low-potential output terminals of the rectifying and smoothing circuit 11.

The driving circuit 5 according to Embodiment 2 differs from the driving circuit 1 according to Embodiment 1 only in structure of circuit elements that determine a current path in the voltage conversion circuit 5A. The description of the same configuration as that of the driving circuit 1 is omitted, and differences from the driving circuit 1 in the configuration will be mainly described.

Figure 8:
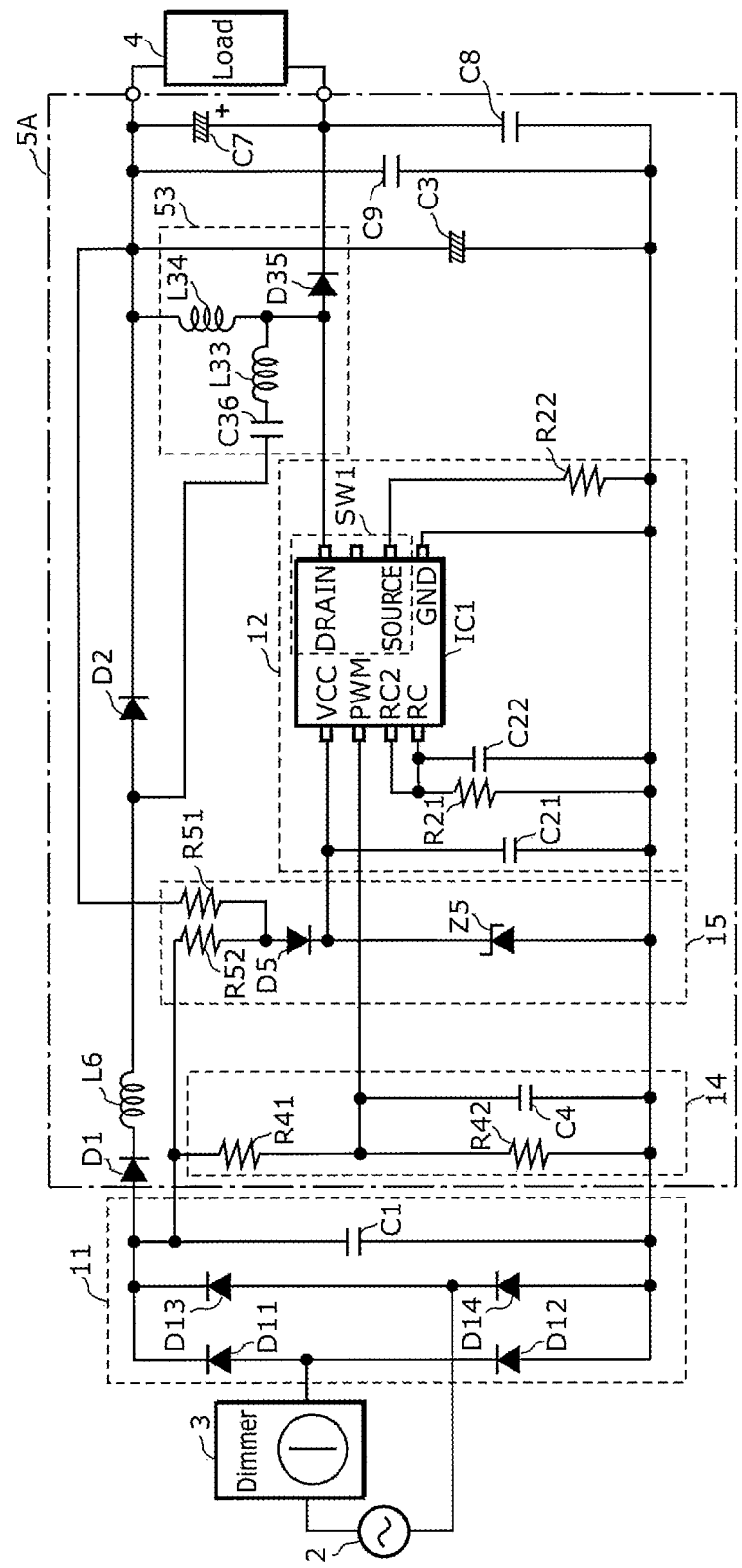
FIG. 8 is a circuit diagram of the driving circuit according to Embodiment 2.

FIG. 8 is a circuit diagram of the driving circuit 5 according to Embodiment 2.

(1) Voltage Conversion Circuit 5A

The voltage conversion circuit 5A includes an oscillation controller 12, a dimming signal detection circuit 14, a power control circuit 15, a switching element SW1 included in an IC 1, diodes D1 and D2, capacitors C3 and C7, a resistor element R22, inductors L33 and L34 included in a buck-boost unit 53, a diode D35, and a capacitor C36. The voltage conversion circuit 5A has a buck-boost function with these circuit elements.

The switching element SW1 is, for example, a MOSFET of N channel. The switching element SW1 has (i) a source connected to the low-potential output terminal of the rectifying and smoothing circuit 11 through the resistor element R22, and (ii) a drain connected to the inductor L33. The switching element SW1 determines ON/OFF timings according to the dimming signal voltage supplied to the PWM terminal of the IC 1.

The diode D1 is a first diode having an anode connected to the high-potential output terminal of the rectifying and smoothing circuit 11. Furthermore, the diode D1 has a cathode connected through the inductor L6 to the anode of the diode D2 and to the capacitor C36. The diode D1 has a function of preventing backflow of the current discharging from the capacitor C36 to the high-potential output terminal of the rectifying and smoothing circuit 11.

The inductor L33 is a first inductor having one end connected to the cathode of the diode D2 through the capacitor C36, and another end connected to the drain of the switching element SW1.

The capacitor C3 has a high-potential terminal connected to (i) the cathode of the diode D2, (ii) a low-potential terminal of the load 4, and (iii) an input terminal of the power control circuit 15, and a low-potential terminal connected to the low-potential output terminal of the rectifying and smoothing circuit 11. The capacitor C3 is a first capacitor that is charged by receiving the magnetic energy from the inductor L33 when the switching element SW1 is OFF, stores energy in the inductor L34 when the switching element SW1 is ON, and discharges the energy to the load 4 through the diode D35 when the switching element SW1 is OFF.

The capacitor C36 is a second capacitor inserted in series between the cathode of the diode D1 and the one end of the inductor L33.

The diode D2 is a second diode having an anode connected to a connecting point between the diode D1 and the capacitor C36, and a cathode connected to the high-potential terminal of the capacitor C3.

The inductor L34 is a second inductor having one end connected to the other end of the inductor L33, and another end connected to the cathode of the diode D2.

The diode D35 is a third diode having an anode connected to the other end of the inductor L33, and a cathode connected to a high-potential terminal of the load 4.

The resistor element R22 detects a drain current flowing through the switching element SW1, based on a voltage across the resistor element R22.

The capacitor C7 has one end connected to the cathode of the diode D2, and another end connected to the cathode of the diode D35.

The voltage conversion circuit 5A having such a configuration outputs a voltage across the capacitor C7 to the load 4 connected in parallel with the capacitor C7.

(2) Power Control Circuit 15

The power control circuit 15 is a circuit that stably supplies a supply voltage to the oscillation controller 12 that controls ON/OFF timings of the switching element SW1, and is connected to one terminal of the capacitor C3 through the resistor element R51, and to the anode of the diode D1 through the resistor element R52. With the configuration, the power control circuit 15 can be supplied with power from the high-potential output terminal of the rectifying and smoothing circuit 11 via the resistor element R52, and from the voltage conversion circuit 5A through the resistor element R51. In other words, the power control circuit 15 applies a voltage corresponding to a voltage at the high-potential terminal of the capacitor C3, to the oscillation controller 12 as a supply voltage for driving the oscillation controller 12. Since the voltage is stably supplied to the power supply terminal VCC of the oscillation controller 12, the switching element SW1 can be stably oscillated.

Furthermore, a Zener diode Z5 has an anode connected to the power supply terminal VCC and a cathode connected to the low-potential output terminal of the rectifying and smoothing circuit 11. This configuration can prevent the power supply terminal VCC from having the input voltage higher than or equal to a predetermined voltage.

[Operation of Driving Circuit]

Next, operations of the driving circuit 5 according to Embodiment 2 will be described.

Figure 9A:
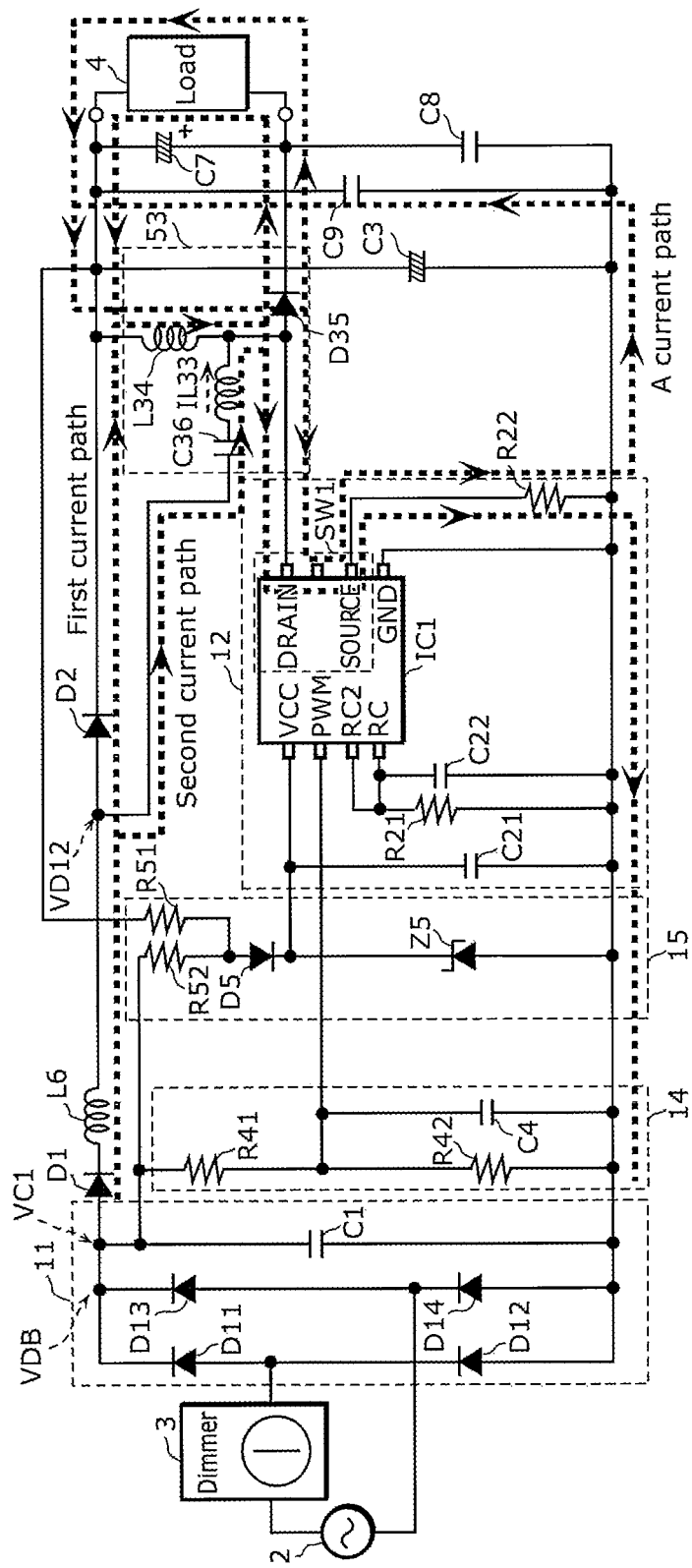
Figure 9B:
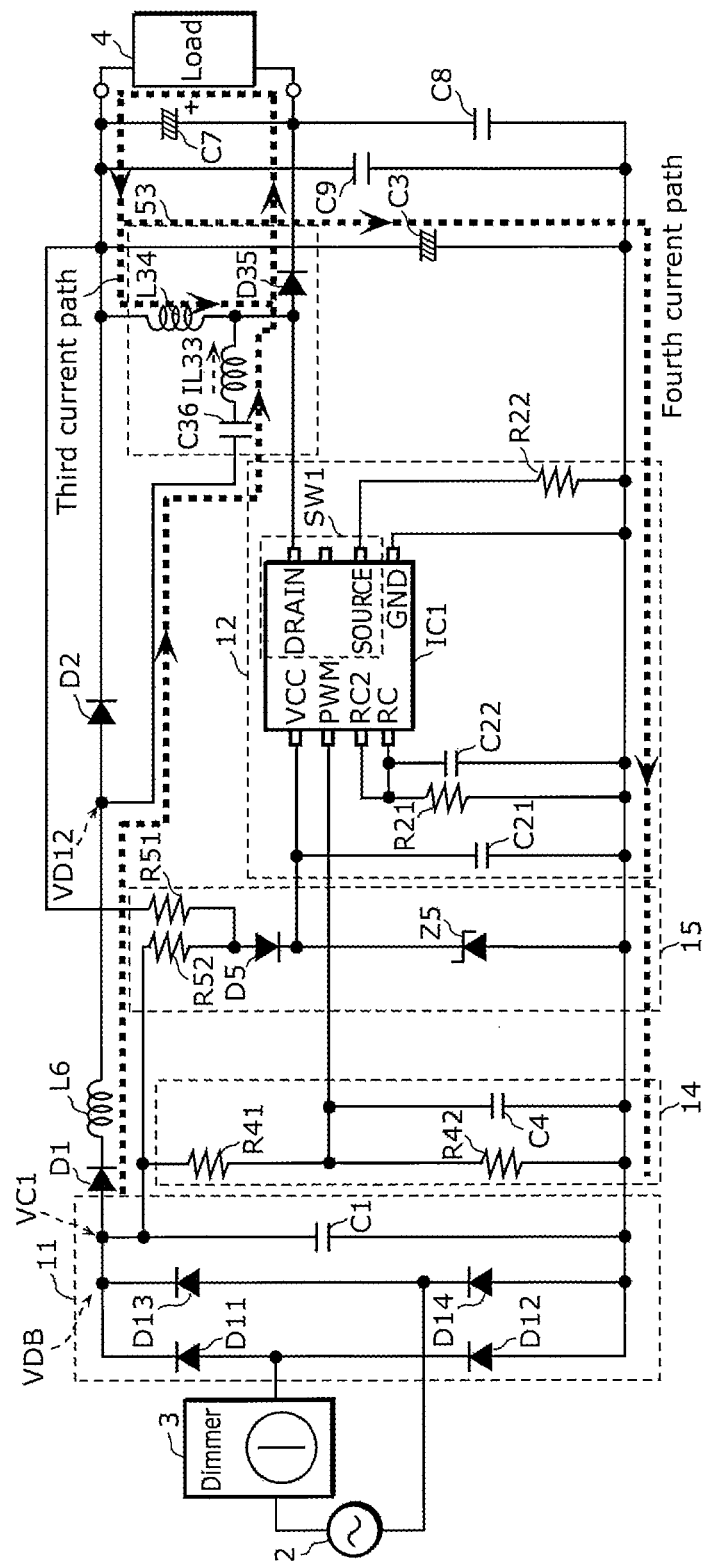
FIG. 9B is a circuit diagram illustrating current flows of the driving circuit according to Embodiment 2 when the switching element is OFF.

FIG. 9A is a circuit diagram illustrating current flows of the driving circuit 5 according to Embodiment 2 when the switching element SW1 is ON. FIG. 9B is a circuit diagram illustrating current flows of the driving circuit 5 when the switching element SW1 is OFF.

As illustrated in FIG. 9A, when the switching element SW1 is ON (first state), a current flows through a path from the high-potential output terminal of the rectifying and smoothing circuit 11, the diodes D1 and D2, the inductor L34, the diode D35, the load 4, the inductor L34, the switching element SW1, and the resistor element R22, and then back to the low-potential output terminal of the rectifying and smoothing circuit 11 (hereinafter referred to as "first current path"). Furthermore, the current flowing from the high-potential output terminal of the rectifying and smoothing circuit 11 partly flows through a path from the diode D1, the capacitors C36, the inductor L33, and the switching element SW1 to the resistor element R22, and then back to the low-potential output terminal of the rectifying and smoothing circuit 11 (hereinafter referred to as "second current path"). Furthermore, a current flows through a path from the high-potential terminal of the capacitor C3, the inductor L34, the diode D35, the load 4, the inductor L34, and the switching element SW1 to the resistor element R22, and then back to the low-potential terminal of the capacitor C3 (hereinafter referred to as "A current path").

In the first state, the current flowing from the high-potential output terminal of the rectifying and smoothing circuit 11 through the first current path is supplied to the load 4 and the inductor L34, so that the inductor L34 stores the magnetic energy. This configuration suppresses fluctuations in the current flowing from the rectifying and smoothing circuit 11 to the load 4 and the inductor L34. Thus, the energy stably supplied to the inductor L34 can suppress fluctuations in the supply voltage to the load 4. Furthermore, with the current flowing from the high-potential output terminal of the rectifying and smoothing circuit 11 through the second current path, the capacitor C36 is charged, and the magnetic energy is stored in the inductor L33. Furthermore, the load 4 is supplied with the current flowing from the high-potential terminal of the capacitor C3 through the A current path, and fluctuations in the current flowing through the load 4 can be suppressed.

As illustrated in FIG. 9B, when the switching element SW1 is OFF (second state), a current flows through a path from the inductor L34 to the diode D35 and the load 4 and then back to the inductor L34 (hereinafter referred to as "third current path"). Simultaneously, a current flows through a path from the high-potential output terminal of the rectifying and smoothing circuit 11, the diode D1, the capacitor C36, the inductor L33, the diode D35, the load 4, and the capacitor C3, and then back to the low-potential output terminal of the rectifying and smoothing circuit 11 (hereinafter referred to as "fourth current path").

In the second state, the magnetic energy stored in the inductor L34 is discharged to the load 4 with the current flowing through the third current path, and the magnetic energy stored in the inductor L33 is also discharged to the capacitor C3 with the current flowing through the fourth current path. Furthermore, the current flowing from the high-potential output terminal of the rectifying and smoothing circuit 11 continues to be charged in the capacitor C36.

Then, when the switching element SW1 is OFF, upon completion of charging the capacitor C36, the capacitor C36 soon starts to discharge the stored charges. Here, the capacitor C36 stores energy ECa expressed by Expression 1 below, where Ca denotes a capacitance of the capacitor C36 and V36 denotes a voltage across the capacitor C36. Then, the capacitor C36 discharges this energy ECa.

$$ECa = Ca \times (V36)^2/2 \qquad \text{(Expression 1)}$$

Then, the current flows from the inductor L34 through the third current path, and the current flowing from the inductor L33 through the capacitor C36, the diode D2, and the inductor L34 transfers the energy stored in the capacitor C36 to the inductor L34. Then, the energy stored in the inductor L34 is supplied to the load 4 through the diode D35, the load 4, and the inductor L34. Thus, the energy from the inductor L33 and the capacitor C36 flows through a path from the inductor L34 to the load 4, and then back to the inductor L33 as a current path (hereinafter referred to as "fifth current path").

Figure 10:
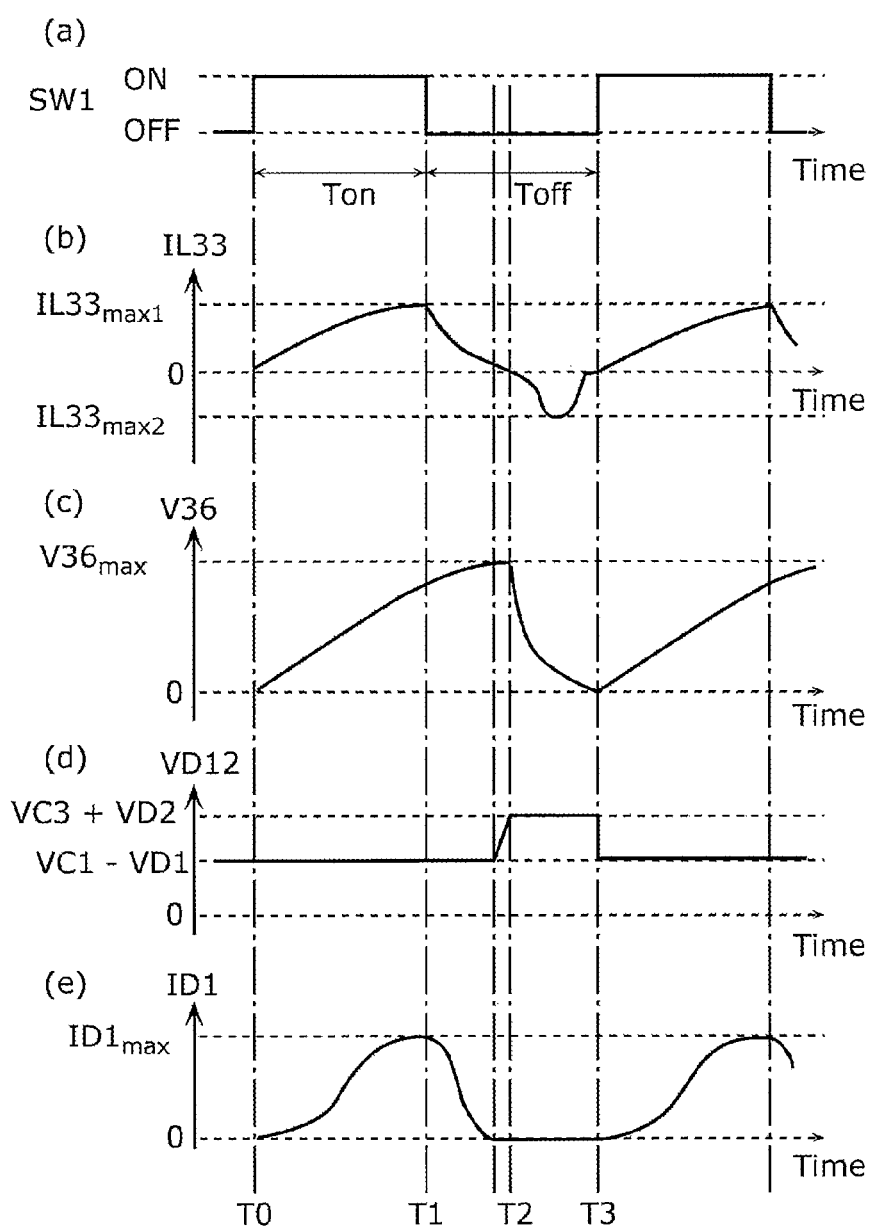
FIG. 10 indicates current and voltage waveform charts of a portion of a voltage conversion circuit according to Embodiment 2 when the switching element is turned ON or OFF.

FIG. 10 indicates current and voltage waveform charts of a portion of the voltage conversion circuit 5A according to Embodiment 2 when the switching element SW1 is turned ON or OFF. More specifically in FIG. 10, (a) indicates the ON and OFF operations of the switching element SW1, (b) indicates a time response waveform of a current IL33 flowing through the inductor L33, (c) indicates a time response waveform of a voltage V36 across the capacitor C36, (d) indicates a time response waveform of a voltage VD12 of the cathode of the diode D1, and (e) indicates a time response waveform of a current ID1 flowing through the diode D1.

At a time T0 when the switching element SW1 is ON, a current starts to flow from the high-potential output terminal of the rectifying and smoothing circuit 11, the diode D1, and the capacitor C36 to the inductor L33.

Then, during a period from the time T0 to a time T1 when the switching element SW1 is ON, the current flowing through the capacitor C36 and the inductor L33 gradually increases. Here, the voltage VD12 is maintained as a voltage lower than the output voltage VC1 of the rectifying and smoothing circuit 11 by the ON voltage VD1 of the diode D1 that remains conducting. Then, the current ID1 flowing through the diode D1 increases to the maximum $ID1_{max}$.

Next, when the switching element SW1 is OFF at the time T1, the magnetic energy stored in the inductor L34 starts to discharge from the inductor L34.

During a period between the times T1 and T2, the capacitor C36 has yet to be charged and a current continues to flow through the inductor L33. Thus, until completion of discharging of this magnetic energy, the current continues to flow from the high-potential output terminal of the rectifying and smoothing circuit 11, the diode D1, and the capacitor C36 to the inductor L33. The current IL33 gradually decreases as the voltage V36 across the capacitor C36 approximates to the maximum output voltage $V36_{max}$. Here, the voltage VD12 of the cathode of the diode D1 is maintained as a voltage (first voltage) lower than the output voltage VC1 of the rectifying and smoothing circuit 11 by the ON voltage VD1 of the diode D1 that remains conducting. Then, the current ID1 gradually decreases from the maximum $ID1_{max}$. This is because charging of the capacitor C36 approaches its completion.

Next, when the switching element SW1 is OFF at the time T2 and the voltage across the capacitor C36 reaches $V36_{max}$, the energy stored in the inductor L33 runs out, and the capacitor C36 starts to discharge. Then, a current flows from the inductor L33, the capacitor C3, the diode D2, and the inductor L34, and then back to the inductor L33. This current transfers the energy of the capacitor C36 to the inductor L34. The energy stored in the inductor L34 is supplied to the load 4 through the diode D35. These processes considered as a phenomenon reduce a decrease rate of the gradually decreasing current flowing from the inductor L34 to the load 4 through the diode D35, thus resulting in extension of the energy discharging period from the inductor L34. This flow is equivalent to the flow of the current from the capacitor C36 to the load 4.

During a period between the times T2 and T3, the voltage VD12 becomes a voltage higher than the voltage VC3 across the capacitor C3 by the ON voltage VD2 of the diode D2, and the diode D1 is nonconducting. Then, the current ID1 becomes zero. The charge charged in the capacitor C36 is discharged by the current flowing from the capacitor C36 to the load 4 through the diode D2. Then, during a period when the capacitor C36 discharges the charge, the voltage VD12 is maintained as a voltage higher than the voltage VC3 by the voltage VD2, and the diode D1 remains nonconducting.

When the switching element SW1 is again ON at the time T3, a current starts to flow from the capacitor C1, the diode D1, and the capacitor C36 to the inductor L33.

As described above in the driving circuit 5, a current continues to flow from the rectifying and smoothing circuit 11 to the voltage conversion circuit 5A through the diode D1 by changing the voltage VD12 in synchronization with the cycles of the ON and OFF operations of the switching element SW1, even when the output voltage VC1 of the rectifying and smoothing circuit 11 has a lower instantaneous value. More specifically, when the voltage VD12 is higher than the voltage VC3 by the voltage VD2, that is, the voltage VD12 is higher than the voltage VC1 (hereinafter referred to as "first voltage"), the diode D1 is nonconducting, and the current flowing from the AC power supply 2 to the voltage conversion circuit 5A through the rectifying and smoothing circuit 11 is interrupted.

When the voltage VD12 is lower than the voltage VC1 by the voltage VD1 (hereinafter referred to as "second voltage"), the diode D1 is conducting, and the current flows from the AC power supply 2 to the voltage conversion circuit 5A through the rectifying and smoothing circuit 11. As FIG. 10 shows that in the driving circuit 5, a current continues to flow from the rectifying and smoothing circuit 11 to the voltage conversion circuit 5A through the diode D1 by switching between the first state and the second state in synchronization with the cycles of the ON and OFF operations of the switching element SW1.

Next, the voltage and current waveforms of each of the constituent elements in the voltage conversion circuit 5A for each cycle of an input AC power will be described.

Figure 11A:
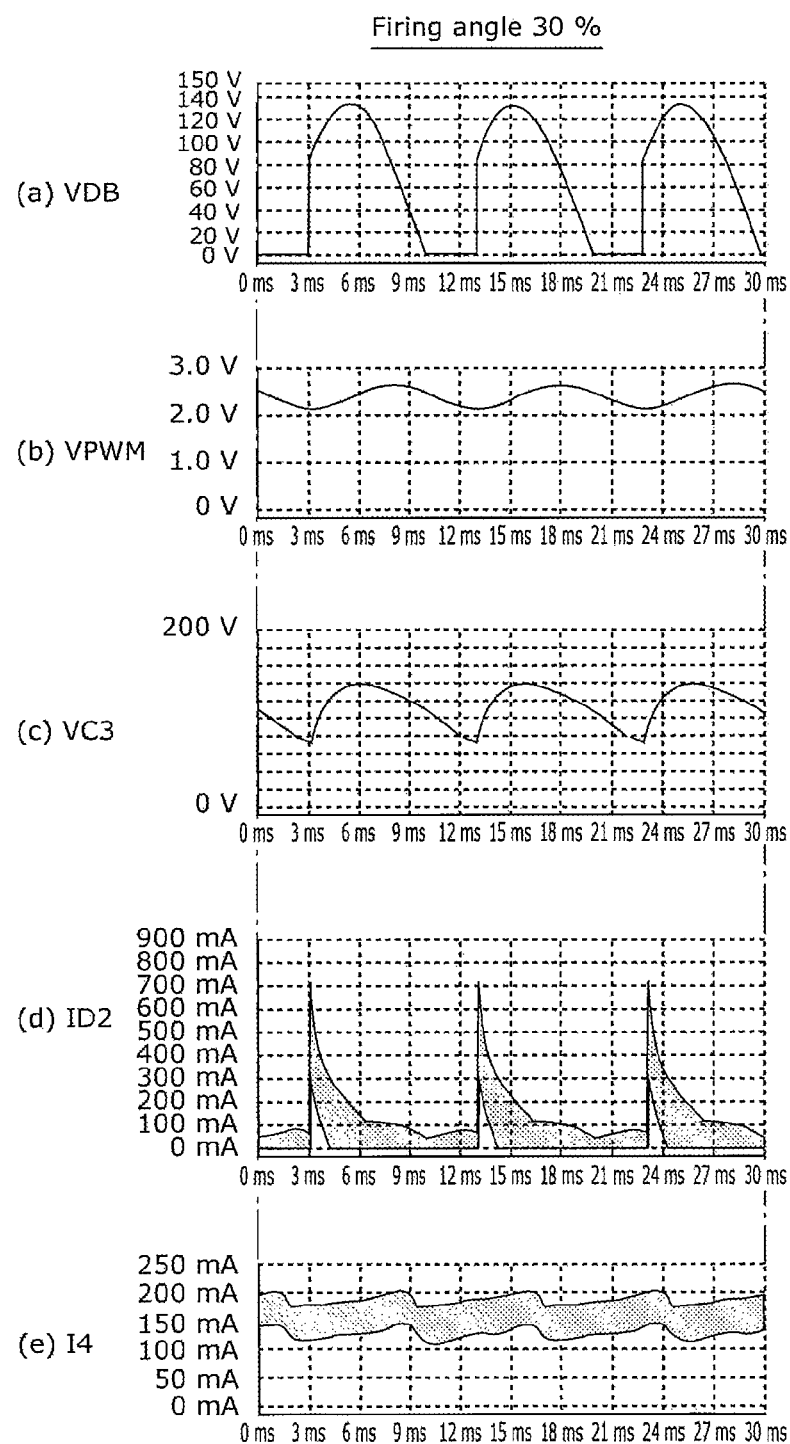
FIG. 11A indicates current and voltage waveform charts of a portion of the voltage conversion circuit according to Embodiment 2 when the firing angle in the leading edge mode is 30%.
Figure 11B:
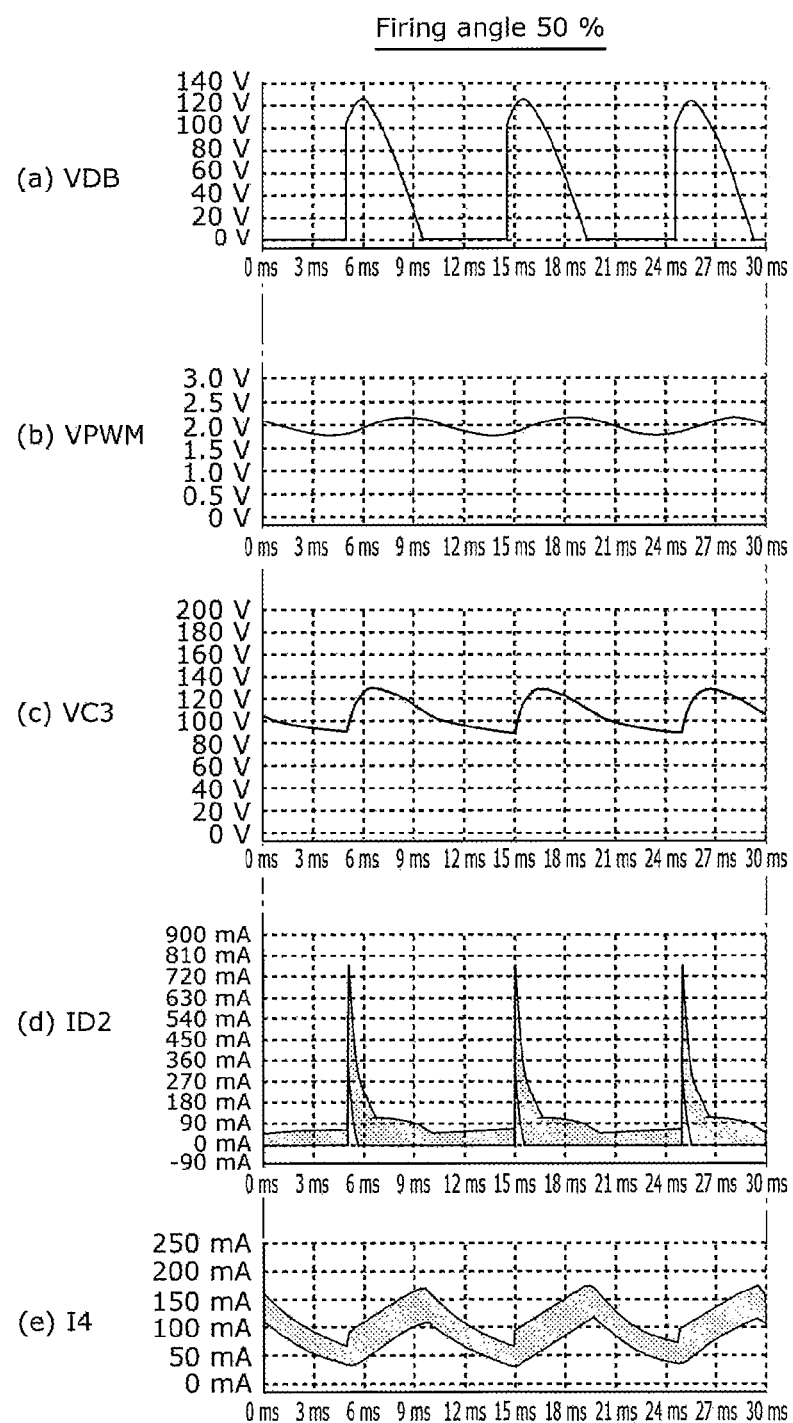
FIG. 11B indicates current and voltage waveform charts of a portion of the voltage conversion circuit according to Embodiment 2 when the firing angle in the leading edge mode is 50%.
Figure 11C:
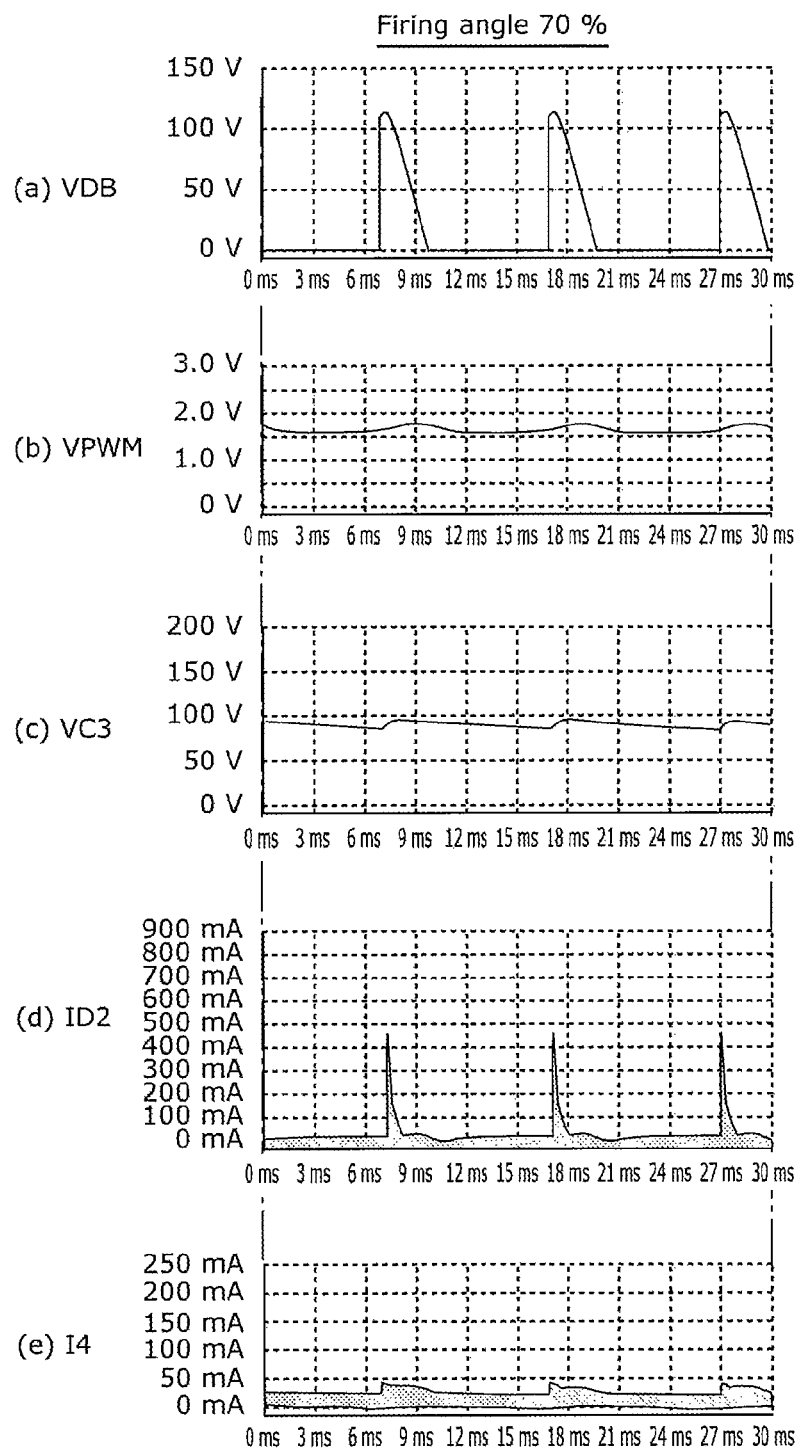
FIG. 11C indicates current and voltage waveform charts of a portion of the voltage conversion circuit according to Embodiment 2 when the firing angle in the leading edge mode is 70%.

FIG. 11A illustrates current and voltage waveform charts of each of the constituent elements in the voltage conversion circuit 5A according to Embodiment 2 when a firing angle in the leading edge mode is 30%. FIG. 11B indicates current and voltage waveform charts of each of the constituent elements in the voltage conversion circuit 5A according to Embodiment 2 when the firing angle in the leading edge mode is 50%. FIG. 11C indicates current and voltage waveform charts of each of the constituent elements in the voltage conversion circuit 5A according to Embodiment 2 when the firing angle in the leading edge mode is 70%.

The input voltage from the AC power supply 2 to the dimmer 3 has a sinusoidal waveform. Furthermore, the input voltage from the dimmer 3 to the rectifying and smoothing circuit 11 has also a sinusoidal waveform having a leading edge. Furthermore, the output voltage VDB of the diode bridge of the rectifying and smoothing circuit 11 has waveforms illustrated in (a) of FIG. 11A, (a) of FIG. 11B, and (a) of FIG. 11C when the firing angle is 30%, 50%, and 70%, respectively.

Next, the dimming signal detection circuit 14 applies to the dimming signal input terminal PWM of the IC 1 a dimming signal voltage VPWM obtained by dividing and smoothing the voltage VC1 of the capacitor C1. Furthermore, the dimming signal voltage VPWM has waveforms illustrated in (b) of FIG. 11A, (b) of FIG. 11B, and (b) of FIG. 11C when the firing angle is 30%, 50%, and 70%, respectively. The dimming signal voltage VPWM is smoother than the output voltage VDB of the diode bridge, and is lower as the firing angle is larger.

Next, the voltage VC3 of the capacitor C3 has pulsating temporal waveforms as illustrated in (c) of FIG. 11A, (c) of FIG. 11B, and (c) of FIG. 11C, and is maintained higher than or equal to a predetermined voltage value (for example, 80 V). Accordingly, the power control circuit 15 can stably supply the voltage VC3 to the power supply terminal VCC of the IC 1.

Here, the voltage VD12 of the cathode of the diode D1 is switched between the first voltage and the second voltage in synchronization with the cycles of the ON and OFF operations of the switching element SW1. When the voltage VD12 is equal to the second voltage, the absolute magnitude of the current flowing from the AC power supply 2 to the rectifying and smoothing circuit 11 is approximately equal to that of the current ID1 flowing through the diode D1.

The current ID2 flowing through the diode D2 has respective waveforms illustrated in (d) of FIG. 11A, (d) of FIG. 11B, and (d) of FIG. 11C. Furthermore, the period during which the current ID2 flows continues after the absolute value Vs of the input AC voltage in the half cycle of the input AC voltage reaches its maximum, when the firing angle is any one of 30%, 50%, and 70%. This shows that the current flows from the AC power supply 2 to the rectifying and smoothing circuit 11 during the period. Accordingly, the power factor herein can be more improved than that of the conventional configuration having no period during which a current flows from the AC power supply 2 to the rectifying and smoothing circuit 11 after the absolute value Vs of the input AC voltage reaches its maximum. Actually, the power factor in a configuration having no period during which a current flows from the AC power supply 2 to the rectifying and smoothing circuit 11 after the absolute value Vs of the input AC voltage reaches its maximum (hereinafter referred to as "configuration according to a comparative example") approximately ranges from 0.56 to 0.61, whereas the power factor of the driving circuit 5 according to Embodiment 2 can be increased to 0.9 or higher.

(e) of FIG. 11A, (e) of FIG. 11B, and (e) of FIG. 11C illustrate respective waveforms of the current I4 flowing through the load 4. The waveforms show that the current I4 flows according to each dimming level.

Although not illustrated, since the power control circuit 15 generates a voltage to be supplied to the power supply terminal VCC of the IC 1 with reference to the voltage of the capacitor C3, the supply voltage VCC becomes stable. Furthermore, the supply voltage VCC for driving the switching element SW1 can be secured from the capacitor C3 of the voltage conversion circuit 5A.

Figure 12:
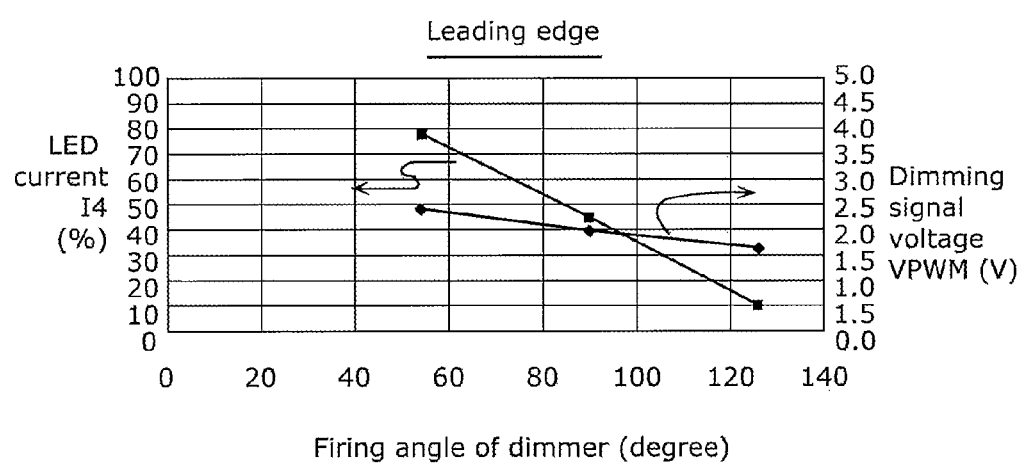
FIG. 12 graphs a relationship between (i) an LED current and a dimming signal voltage that are generated by the driving circuit according to Embodiment 2 and (ii) the firing angle in the leading edge mode.

FIG. 12 graphs a relationship between (i) the LED current and the dimming signal voltage that are generated by the driving circuit 5 according to Embodiment 2 and (ii) the firing angle in the leading edge mode. FIG. 12 shows that the dimming signal voltage smoothly decreases without any malfunction of the dimmer 3 as the firing angle increases. In response to this phenomenon, the current I4 of the load 4 that is an LED smoothly decreases. The trailing edge mode also produces the same advantages as those of the leading edge mode.

Conventionally, the supply voltage VCC for driving the switching element SW1 is secured from the output terminals of the rectifying and smoothing circuit 11 or the cathode of the diode D2. Since the potential of the output terminals of the rectifying and smoothing circuit 11 or the cathode of the diode D2 extremely decreases according to the dimming level or strongly depends on the time, the supply voltage fluctuates and the switching operation cannot be stabilized. Thus, it is feared that abrupt change in luminance or flicker may occur in the higher and lower luminance regions. Since the driving circuit 5 according to Embodiment 2 secures the supply voltage from the capacitor C3 of the voltage conversion circuit 5A, it can obtain the excellent properties as indicated in FIG. 12. Conventionally, when the dimmer 3 is OFF, the leakage current flows from the dimmer 3. However, since no input current flows to the lamp (the load 4), the output voltage of the dimmer 3 may increase to, for example, a higher voltage over 50 V. This output voltage causes the control circuit of the dimmer 3 to malfunction and the lamp to flicker. In contrast, since the input current to the lamp flows almost for the entire period in the driving circuit 5 according to Embodiment 2, the output terminal voltage of the dimmer 3 can be maintained as a voltage lower than or equal to 50 V even when the switching element SW1 is OFF. Accordingly, the smooth dimming properties can be obtained with no malfunction of the dimmer 3 and no flicker of the lamp.

In summary of the operations of the driving circuit 5 according to Embodiment 2, the capacitor C3 discharges when the switching element SW1 is ON (first state), and simultaneously, magnetic energy is stored in the inductor L33 with a current flowing from the capacitor C1 to the inductor L33 through the diode D1. When the switching element SW1 is OFF (second state), the magnetic energy stored in the inductor L33 is discharged to the capacitor C3, and simultaneously, a current flows from the capacitor C1 to the inductor L33 through the diode D1 to compensate for the energy discharged from the inductor L33. The driving circuit 5 alternates between the operations in the first and second states.

Accordingly, the driving circuit 5 according to Embodiment 2 can extend a period during which a current flows from the AC power supply 2 to the voltage conversion circuit 5A through the rectifying and smoothing circuit 11. Furthermore, the supply voltage VCC for driving the switching element SW1 can be secured from the capacitor C3 of the voltage conversion circuit 5A. Accordingly, the driving circuit 5 can improve the power factor and suppress abrupt change in luminance in the dimming.

Embodiment 3

Configuration of Driving Circuit

Figure 13:
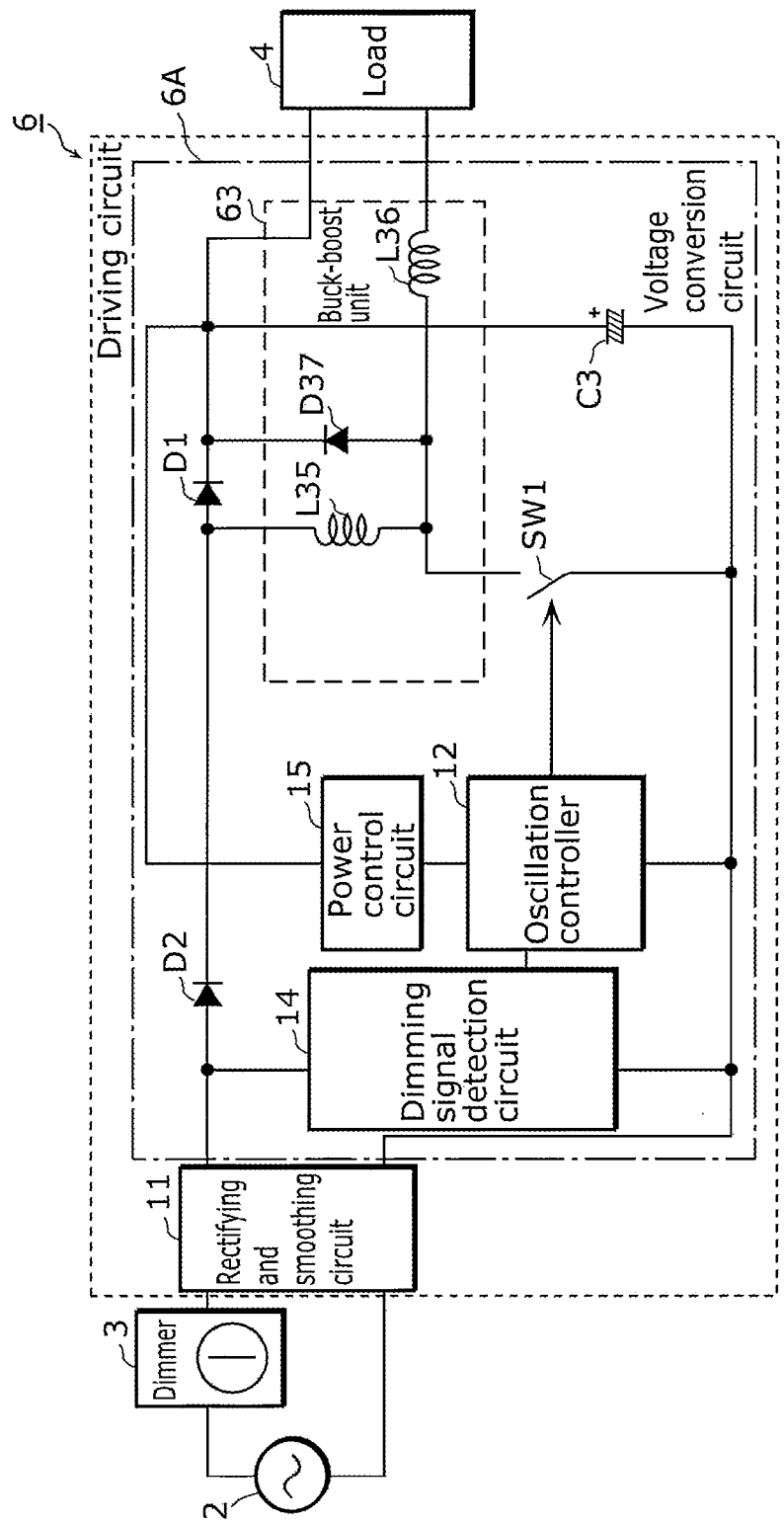
FIG. 13 is a block diagram of a driving circuit according to Embodiment 3.

FIG. 13 is a block diagram illustrating a driving circuit 6 according to Embodiment 3. As illustrated in FIG. 13, the driving circuit 6 according to Embodiment 3 includes a rectifying and smoothing circuit 11 connected to an AC power supply 2 and a dimmer 3, and a voltage conversion circuit 6A connected to high-potential and low-potential output terminals of the rectifying and smoothing circuit 11.

The driving circuit 6 according to Embodiment 3 differs from the driving circuit 1 according to Embodiment 1 only in structure of circuit elements that determine a current path in the voltage conversion circuit 6A. The description of the same configuration as that of the driving circuit 1 is omitted, and differences from the driving circuit 1 in the configuration will be mainly described.

Figure 14:
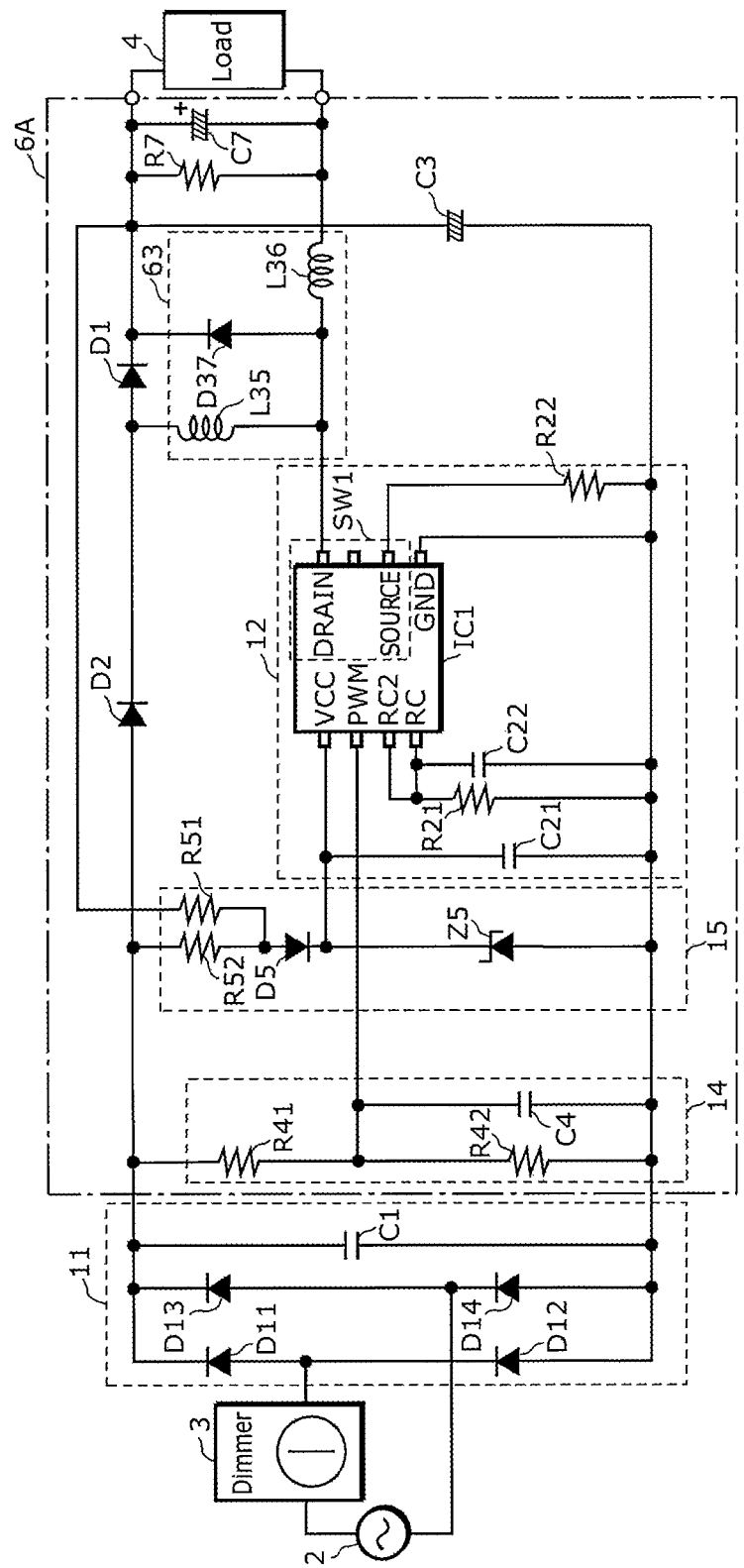
FIG. 14 is a circuit diagram of the driving circuit according to Embodiment 3.

FIG. 14 is a circuit diagram of the driving circuit 6 according to Embodiment 3.

(1) Voltage Conversion Circuit 6A

The voltage conversion circuit 6A includes an oscillation controller 12, a dimming signal detection circuit 14, a power control circuit 15, a switching element SW1 included in an IC 1, diodes D1 and D2, capacitors C3 and C7, a resistor element R22, inductors L35 and L36 included in a buck-boost unit 63, and a diode D37. The voltage conversion circuit 6A has a boost function with these circuit elements.

The switching element SW1 is, for example, a MOSFET of N channel. The switching element SW1 has (i) a source connected to the low-potential output terminal of the rectifying and smoothing circuit 11 through the resistor element R22, and (ii) a drain connected to the inductor L35. The switching element SW1 determines ON/OFF timings according to the dimming signal voltage supplied to the PWM terminal of the IC 1.

The diode D2 is a first diode having an anode connected to the high-potential output terminal of the rectifying and smoothing circuit 11. Furthermore, the diode D2 has a cathode connected to the anode of the diode D1, and to the inductor L35. The diode D2 has a function of preventing backflow of the current from a connecting point between the inductors L35 and L36 to the capacitor C1 when the connecting point has a potential higher than that of the capacitor C1.

The inductor L35 is a first inductor having one end connected to the cathode of the diode D2, and another end connected to the drain of the switching element SW1.

The capacitor C3 has a high-potential terminal connected to the cathode of the diode D1, to the high-potential terminal of the load 4, and to an input terminal of the power control circuit 15, and a low-potential terminal connected to the low-potential output terminal of the rectifying and smoothing circuit 11. The capacitor C3 is a first capacitor that is charged by receiving the magnetic energy from the inductor L35 when the switching element SW1 is OFF, and discharges to the load 4 when the switching element SW1 is ON.

The inductor L36 is a second inductor having one end connected to the other end of the inductor L35, and another end connected to a low-potential terminal of the load 4.

The diode D1 is a second diode having an anode connected to the cathode of the diode D2, and a cathode connected to the high-potential terminal of the capacitor C3.

The diode D37 is a third diode having an anode connected to the other end of the inductor L35, and a cathode connected to the high-potential terminal of the capacitor C3.

The resistor element R22 detects a drain current flowing through the switching element SW1, based on a voltage across the resistor element R22.

The capacitor C7 has one end connected to the cathode of the diode D1, and another end connected to the other end of the inductor L36.

The voltage conversion circuit 6A having such a configuration outputs a voltage across the capacitor C7 to the load 4 connected in parallel with the capacitor C7.

(2) Power Control Circuit 15

The power control circuit 15 is a circuit that stably supplies a supply voltage to the oscillation controller 12 that controls ON/OFF timings of the switching element SW1, and is connected to one end of the capacitor C3 through the resistor element R51, and to the anode of the diode D2 through the resistor element R52. With the configuration, the power control circuit 15 can be supplied with power from the high-potential output terminal of the rectifying and smoothing circuit 11 via the resistor element R52, and from the voltage conversion circuit 6A through the resistor element R51. In other words, the power control circuit 15 applies a voltage corresponding to a voltage at the high-potential terminal of the capacitor C3, to the oscillation controller 12 as a supply voltage for driving the oscillation controller 12. Since the voltage is stably supplied to the power supply terminal VCC in the oscillation controller 12, the switching element SW1 can be stably oscillated.

Furthermore, a Zener diode Z5 has an anode connected to the power supply terminal VCC, and a cathode connected to the low-potential output terminal of the rectifying and smoothing circuit 11. This configuration can prevent the power supply terminal VCC from having the input voltage higher than or equal to a predetermined voltage.

[Operation of Driving Circuit]

Next, operations of the driving circuit 6 according to Embodiment 3 will be described.

Figure 15A:
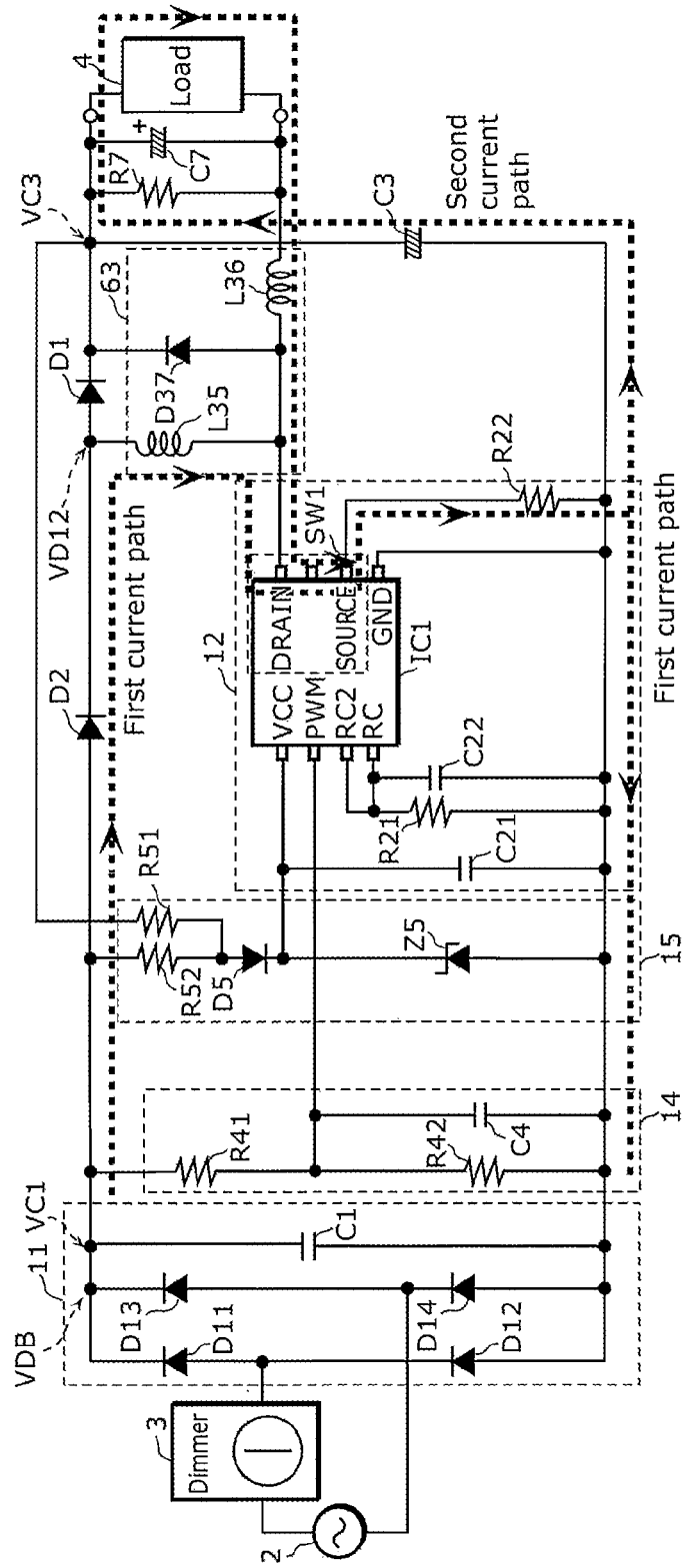
Figure 15B:
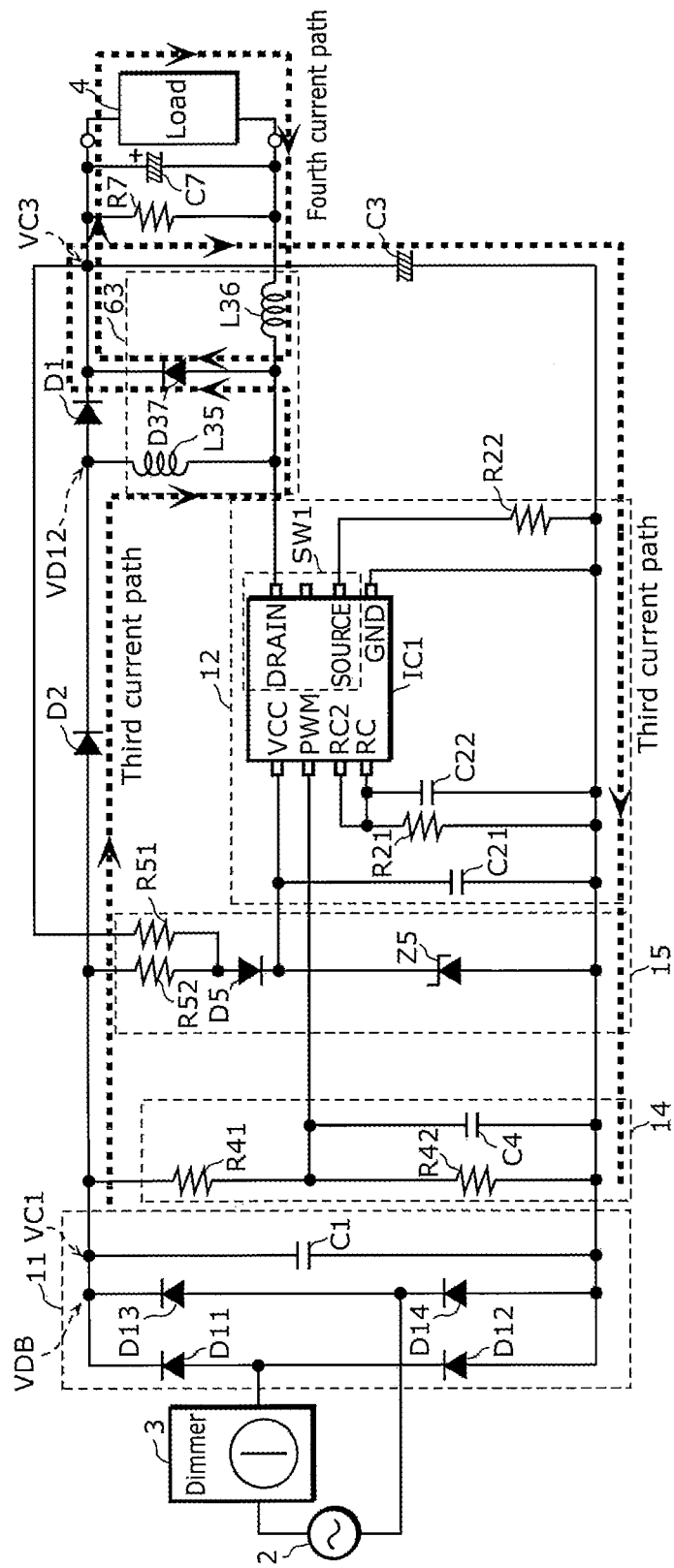
FIG. 15B is a circuit diagram illustrating current flows of the driving circuit according to Embodiment 3 when the switching element is OFF.

FIG. 15A is a circuit diagram illustrating current flows of the driving circuit 6 according to Embodiment 3 when the switching element SW1 is ON. FIG. 15B is a circuit diagram illustrating current flows of the driving circuit 6 when the switching element SW1 is OFF.

As illustrated in FIG. 15A, when the switching element SW1 is ON (first state), a current flows through a path from the high-potential output terminal of the rectifying and smoothing circuit 11, the diode D2, the inductor L35, the switching element SW1, and the resistor element R22, and then back to the low-potential output terminal of the rectifying and smoothing circuit 11 (hereinafter referred to as "first current path"). Furthermore, a current flows through a path from the capacitor C3, the load 4, the inductor L36, and the switching element SW1 to the resistor element R22, and then back to the capacitor C3 (hereinafter referred to as "second current path").

In the first state, magnetic energy is stored in the inductor L35 with the current flowing through the first current path. The second current path equates to a discharging path along which the charge stored in the capacitor C3 when the switching element SW1 is previously OFF is discharged. The magnetic energy is stored in the inductor L36 by discharging the capacitor C3 through the second current path. The voltage across the capacitor C3 is boosted to a voltage higher than the output voltage VC1 of the rectifying and smoothing circuit 11 by discharging the magnetic energy stored in the inductor L35 to the capacitor C3 through the diode D37, when the switching element SW1 is OFF. Thus, the diode D1 is nonconducting, and the current flowing from the rectifying and smoothing circuit 11 to the voltage conversion circuit 6A is interrupted.

As illustrated in FIG. 15B, when the switching element SW1 is OFF (second state), a current flows through a path as a path for discharging the energy stored in the inductor L35, from the inductor L35 to the diode D37, the capacitor C3, the low-potential output terminal of the rectifying and smoothing circuit 11, the AC power supply 2, and the high-potential output terminal of the rectifying and smoothing circuit 11, and then back to the diode D2 (hereinafter referred to as "third current path"). Here, the voltage source that allows the current to flow through the third current path is the inductor L35. Simultaneously, a current flows through a path from one end of the inductor L36, the diode D37, and the load 4 to the other end of the inductor L36 (hereinafter referred to as "fourth current path"). When the magnetic energy stored in the inductor L35 is discharged, the capacitor C3 is charged with the current flowing through the third current path. Furthermore, the voltage across the capacitor C3 is a voltage higher than the cathode voltage (VC1−VD2) of the diode D2 by the voltage across the inductor L35 (VC3−VC1), that is, a voltage boosted only by the energy stored in the inductor L35. Accordingly, the voltage across the capacitor C3 is boosted to the voltage VC3 higher than the output voltage VC1 of the rectifying and smoothing circuit 11. Furthermore, the fourth current path equates to an energy discharging path through which the energy stored in the inductor L36 is discharged to the load 4. The current flowing through the fourth current path discharges the magnetic energy stored in the inductor L36 to the load 4.

Upon completion of discharging of the magnetic energy stored in the inductor L35, the current flowing through the third current path is interrupted, and the current continues to flow through the fourth current path until completion of discharging of the magnetic energy stored in the inductor L36. Furthermore, after completion of discharging of the magnetic energy stored in the inductor L36, the charge stored in the capacitor C7 continues to be discharged to the load 4. Subsequently, the driving circuit 6 repeats the operations according to the ON and OFF operations of the switching element SW1.

As described above, a current flows to the load 4 through the second current path during a period when the switching element SW1 is ON in the driving circuit 6 according to Embodiment 3. During a period when the switching element SW1 is OFF, a current flows from the inductor L36 to the load 4 through the fourth current path. In other words, the driving circuit 6 that is a booster circuit supplies a current to the load 4 through a current path without relying on discharging of the capacitor C7, during both the ON and OFF periods of the switching element SW1. Furthermore, the capacitor C3 is always charged through the third current path, each time the switching element SW1 is OFF. Accordingly, since fluctuations in voltage across the capacitor C3 can be reduced, fluctuations in current flowing from the capacitor C3 to the load 4 through the second current path are suppressed. Accordingly, the driving circuit 6 can be operated with less fluctuations in current flowing through the load 4.

Figure 16:
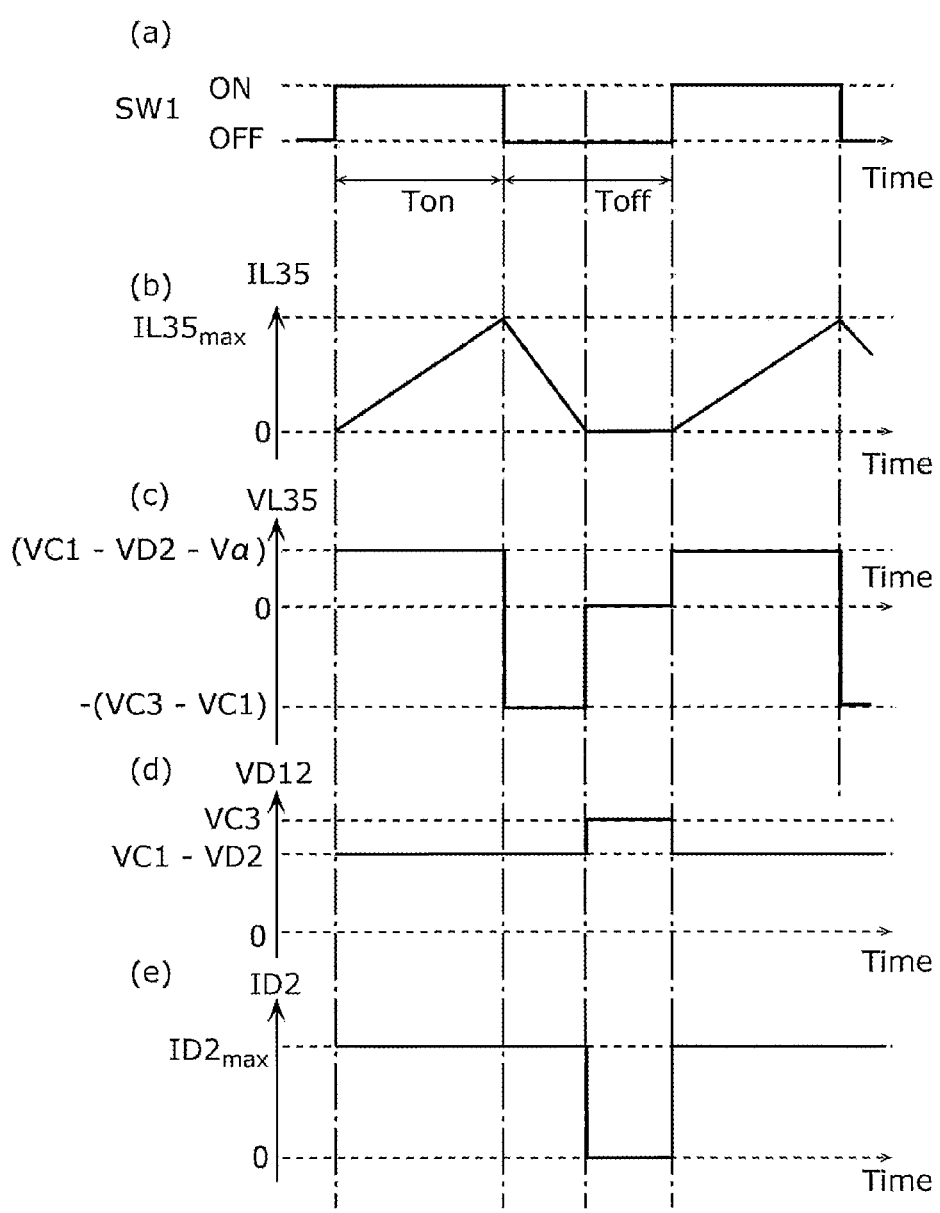
FIG. 16 indicates current and voltage waveform charts of a portion of a voltage conversion circuit according to Embodiment 3 when the switching element is turned ON or OFF.

FIG. 16 indicates current and voltage waveform charts of each of the constituent elements in the voltage conversion circuit 6A according to Embodiment 3 when the switching element SW1 is turned ON or OFF. More specifically in FIG. 16, (a) indicates the ON and OFF operations of the switching element SW1, (b) indicates a time response waveform of a current IL35 flowing through the inductor L35, (c) indicates a time response waveform of a voltage VL35 across the inductor L35, (d) indicates a time response waveform of a voltage VD12 of the cathode of the diode D2, and (e) indicates a time response waveform of a current ID2 flowing through the diode D2. In (c) of FIG. 16, the voltage VL35 across the inductor L35 is positive when one end of the inductor L35 connected to the high-potential output terminal of the rectifying and smoothing circuit 11 through the diode D2 has a voltage higher than the other end thereof.

First, when the switching element SW1 is ON, the current starts to flow through the first current path from the high-potential output terminal of the rectifying and smoothing circuit 11 and the inductor L35 to the switching element SW1. Then, the current IL35 flowing through the inductor L35 gradually increases during the period when the switching element SW1 is ON ((b) of FIG. 16). Here, the voltage across the inductor L35 is maintained as a voltage lower than the output voltage VC1 of the rectifying and smoothing circuit 11 by (i) the ON voltage VD2 of the diode D2 and (ii) a voltage Vα corresponding to a sum of the ON voltage of the switching element SW1 and a voltage drop at the resistor element R22 ((c) of FIG. 16). Furthermore, the voltage VD12 of the cathode of the diode D2 is maintained as a voltage corresponding to a sum of the voltage VL35 and the voltage Vα, that is, a voltage (VC1−VD2) ((d) of FIG. 16). During the period, a current continues to flow through the diode D2 ((e) of FIG. 16).

Next, when the switching element SW1 is OFF, the magnetic energy stored in the inductor L35 is discharged. Accordingly, the current flowing through the third current path via the inductor L35, the diode D37, and the capacitor C3 gradually decreases ((b) of FIG. 16). Here, the voltage across the inductor L35 is a voltage (VC3−VC1) lower than the voltage VC3 of the capacitor C3 by the output voltage VC1 of the rectifying and smoothing circuit 11 ((c) of FIG. 16). Furthermore, the voltage VD12 is maintained constant as a voltage (VC1−VD2) lower than the output voltage VC1 of the rectifying and smoothing circuit 11 by the voltage VD2. Then, a current continues to flow through the third current path from the high-potential output terminal of the rectifying and smoothing circuit 11, the diode D2, the inductor L35, and the diode D37 to the capacitor C3 ((e) of FIG. 16).

Next, upon completion of discharging of the magnetic energy stored in the inductor L35, the current flowing through the third current path is interrupted. Here, the current continues to flow through the fourth current path from the inductor L36 and the diode D37 to the load 4, and then back to the inductor L36 to discharge the magnetic energy stored in the inductor L36. Furthermore, the voltage VD12 of the cathode of the diode D2 is maintained approximately equal to the voltage VC3 across the capacitor C3 ((d) of FIG. 16). Furthermore, the current ID2 is interrupted ((e) of FIG. 16).

When the switching element SW1 is again ON, a current starts to flow through the second current path from the capacitor C3 and the inductor L36 to the switching element SW1. Subsequently, the phenomenon described with reference to FIG. 16 is repeated according to the ON and OFF operations of the switching element SW1.

Furthermore, the period during when the current flows from the AC power supply 2 to the voltage conversion circuit 6A through the rectifying and smoothing circuit 11 (hereinafter referred to as "current flowing period") in one cycle of ON and OFF operations of the switching element SW1 (hereinafter referred to as "one operation cycle") equates to a period during when a current flows through the diode D2 as described above. Furthermore, this current flowing period is equivalent to a sum of the ON period of the switching element SW1 and a period between turning OFF of the switching element SW1 and completion of discharging of the magnetic energy stored in the inductor L35 (see FIG. 16). This current flowing period is changed according to the magnitude of the output voltage VC1 of the rectifying and smoothing circuit 11, when the oscillation controller 12 is controlled to have a constant peak current.

Next, the voltage and current waveforms of each of the constituent elements in the voltage conversion circuit 6A for each cycle of an input AC power will be described.

Figure 17A:
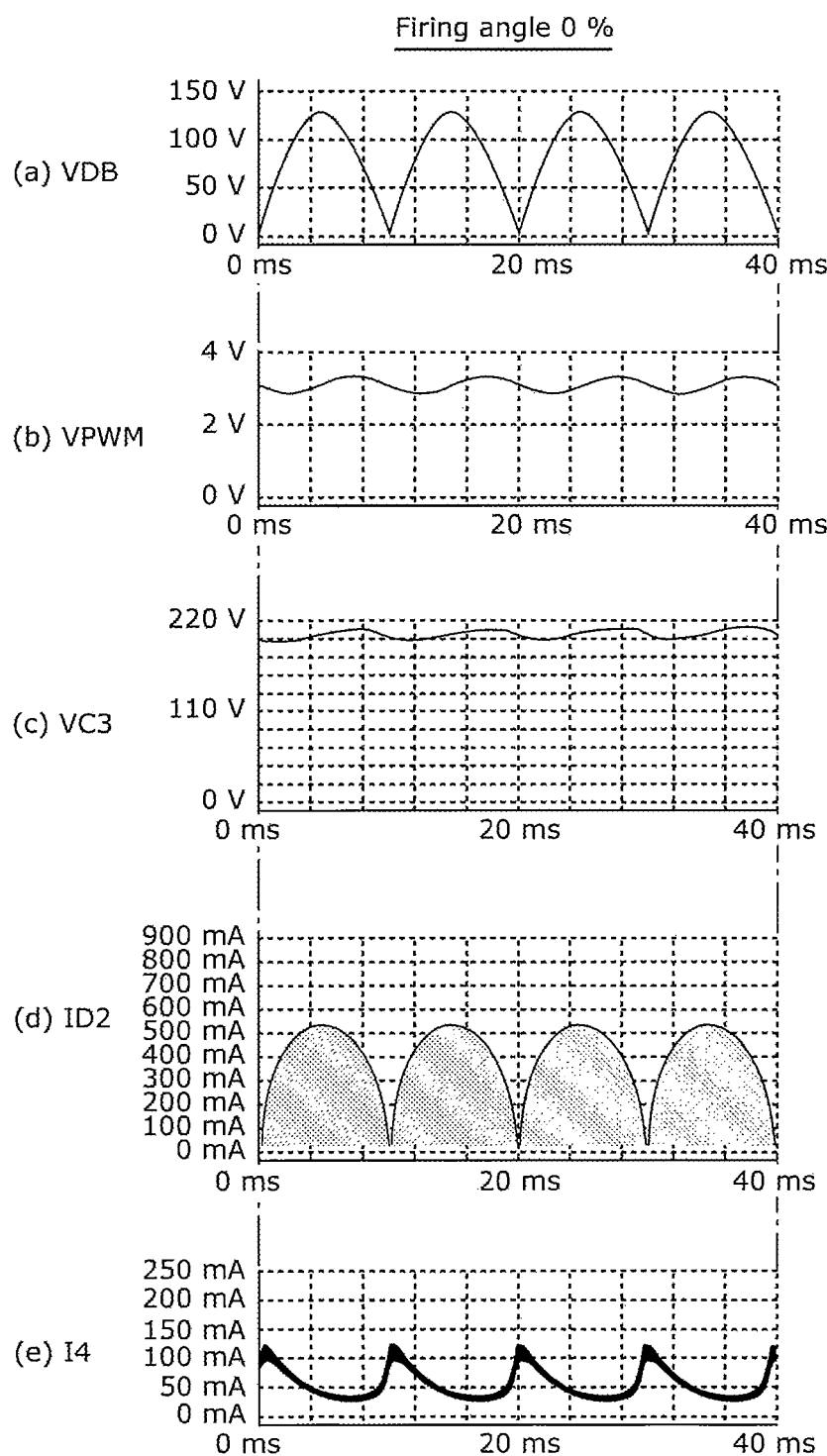
FIG. 17A indicates current and voltage waveform charts of a portion of the voltage conversion circuit according to Embodiment 3 when the firing angle in the leading edge mode is 0%.
Figure 17B:
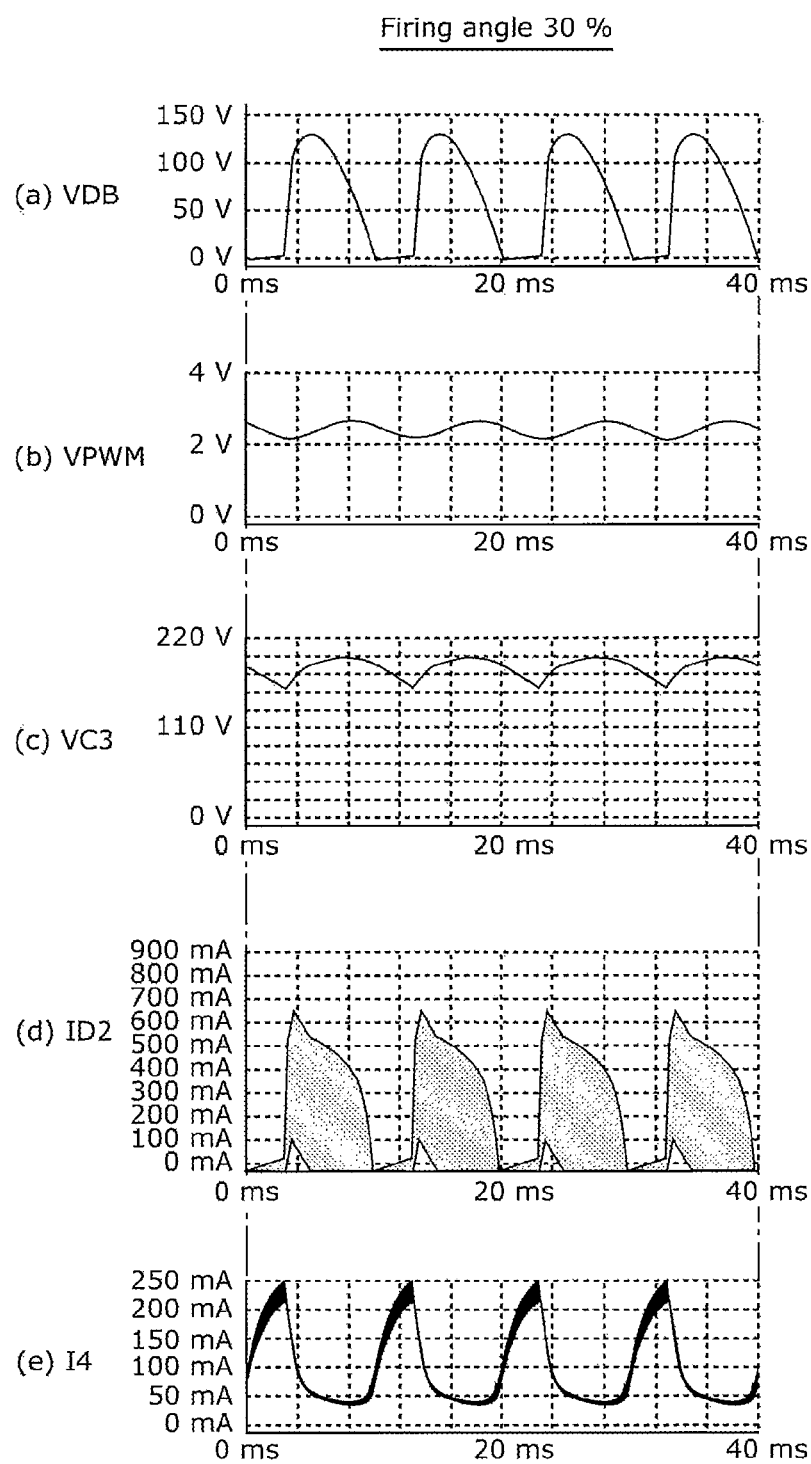
FIG. 17B indicates current and voltage waveform charts of a portion of the voltage conversion circuit according to Embodiment 3 when the firing angle in the leading edge mode is 30%.
Figure 17C:
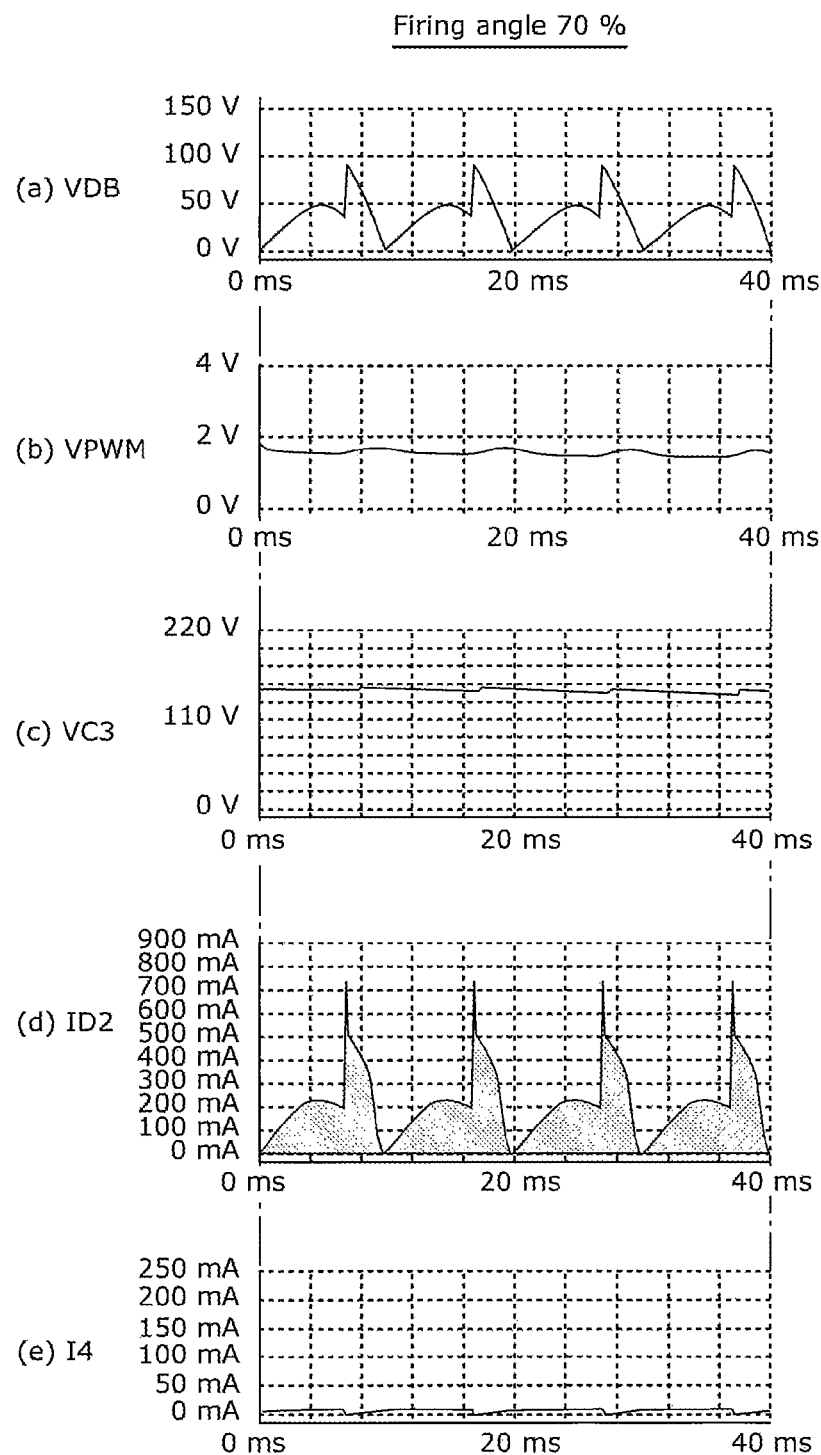
FIG. 17C indicates current and voltage waveform charts of a portion of the voltage conversion circuit according to Embodiment 3 when the firing angle in the leading edge mode is 70%.

FIG. 17A illustrates current and voltage waveform charts of each of the constituent elements in the voltage conversion circuit 6A according to Embodiment 3 when the firing angle in the leading edge mode is 0%. FIG. 17B indicates current and voltage waveform charts of each of the constituent elements in the voltage conversion circuit 6A according to Embodiment 3 when the firing angle in the leading edge mode is 30%. FIG. 17C indicates current and voltage waveform charts of each of the constituent elements in the voltage conversion circuit 6A according to Embodiment 3 when the firing angle in the leading edge mode is 70%.

The input voltage from the AC power supply 2 to the dimmer 3 has a sinusoidal waveform. Furthermore, the input voltage from the dimmer 3 to the rectifying and smoothing circuit 11 has also a sinusoidal waveform having a leading edge. Furthermore, the output voltage VDB of the diode bridge of the rectifying and smoothing circuit 11 has waveforms illustrated in (a) of FIG. 17A, (a) of FIG. 17B, and (a) of FIG. 17C when the firing angle is 0%, 30%, and 70%, respectively.

The dimming signal detection circuit 14 applies to the dimming signal input terminal PWM of the IC 1 a dimming signal voltage VPWM obtained by dividing and smoothing the voltage VC1 of the capacitor C1. Furthermore, the dimming signal voltage VPWM has waveforms illustrated in (b) of FIG. 17A, (b) of FIG. 17B, and (b) of FIG. 17C when the firing angle is 0%, 30%, and 70%, respectively. The dimming signal voltage VPWM is smoother than the output voltage VDB of the diode bridge, and is lower as the firing angle is larger.

Next, the voltage VC3 of the capacitor C3 has pulsating temporal waveforms as illustrated in (c) of FIG. 17A, (c) of FIG. 17B, and (c) of FIG. 17C, and is maintained higher than or equal to a predetermined voltage value (for example, 100 V). Accordingly, the power control circuit 15 can stably supply the voltage VC3 to the power supply terminal VCC of the IC 1.

The current ID2 flowing through the diode D2 has respective waveforms illustrated in (d) of FIG. 17A, (d) of FIG. 17B, and (d) of FIG. 17C. Furthermore, the period during which the current ID2 flows continues after the absolute value Vs of the input AC voltage in the half cycle of the input AC voltage reaches its maximum, when the firing angle is any one of 0%, 30%, and 70%. This shows that the current flows from the AC power supply 2 to the rectifying and smoothing circuit 11 during the period. Accordingly, the power factor herein can be more improved than that of the conventional configuration having no period during which a current flows from the AC power supply 2 to the rectifying and smoothing circuit 11 after the absolute value Vs of the input AC voltage reaches its maximum. Furthermore, the current ID2 flowing through the diode D2 increases as the output voltage VC1 of the rectifying and smoothing circuit 11 has a higher instantaneous value. Actually, the DC power circuit according to the comparative example has a power factor approximately ranging from 0.50 to 0.61, whereas the driving circuit 6 according to Embodiment 3 can easily produce a higher power factor approximately around 0.86 when the input power from the AC power supply 2 to the driving circuit 6 is 3.47 W, without any special control.

(e) of FIG. 17A, (e) of FIG. 17B, and (e) of FIG. 17C illustrate waveforms of a current I4 flowing through the load 4. The waveforms show that the current I4 flows according to each dimming level.

Although not illustrated, since the power control circuit 15 generates a voltage to be supplied to the power supply terminal VCC of the IC 1 with reference to the voltage of the capacitor C3, the supply voltage VCC becomes stable. Furthermore, the supply voltage VCC for driving the switching element SW1 can be secured from the capacitor C3 of the voltage conversion circuit 6A.

Figure 18:
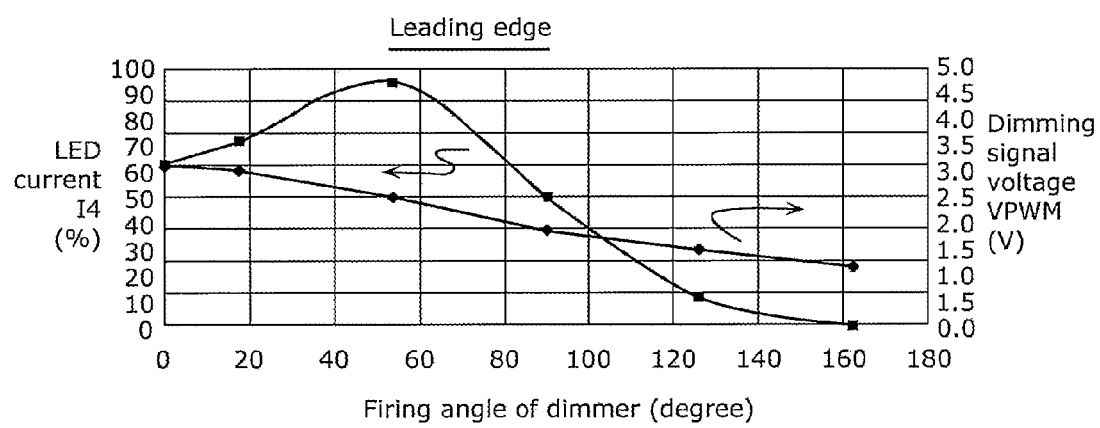
FIG. 18 graphs a relationship between (i) an LED current and a dimming signal voltage that are generated by the driving circuit according to Embodiment 3 and (ii) a firing angle in the leading edge mode.

FIG. 18 graphs a relationship between (i) the LED current and the dimming signal voltage that are generated by the driving circuit 6 according to Embodiment 3 and (ii) the firing angle in the leading edge mode. FIG. 18 shows that the dimming signal voltage smoothly decreases as the firing angle increases, and the current I4 of the load 4 that is an LED smoothly decreases when the firing angle is set to 60 degrees or higher. The trailing edge mode also produces the same advantages as those of the leading edge mode.

Conventionally, the supply voltage VCC for driving the switching element SW1 is secured from the output terminals of the rectifying and smoothing circuit 11 or the cathode of the diode D2. Since the potential of the output terminals of the rectifying and smoothing circuit 11 or the cathode of the diode D2 extremely decreases according to the dimming level or strongly depends on the time, the supply voltage fluctuates and the switching operation cannot be stabilized. Thus, it is feared that abrupt change in luminance or flicker may occur in the higher and lower luminance regions. In contrast, since the driving circuit 6 according to Embodiment 3 obtains the supply voltage from the capacitor C3 of the voltage conversion circuit 6A, it can obtain the excellent properties, particularly in the lower luminance region, as indicated in FIG. 18. Conventionally, when the dimmer 3 is OFF, the leakage current flows from the dimmer 3 to the lamp (the load 4). However, since no input current flows to the lamp, the output voltage of the dimmer 3 may increase to, for example, a higher voltage over 50 V. This output voltage causes the control circuit of the dimmer 3 to malfunction and the lamp to flicker. In contrast, since the input current to the lamp flows almost for the entire period in the driving circuit 6 according to Embodiment 3, the output terminal voltage of the dimmer 3 can be maintained as a voltage lower than or equal to 50 V even when the switching element SW1 is OFF. Accordingly, the smooth dimming properties can be obtained with no malfunction of the dimmer 3 and no flicker of the lamp.

According to Embodiments 1 to 3, since the supply voltage is boosted to have a stable voltage for an electrolytic capacitor and supply energy to a load even when the dimmer 3 dims the light, the current easily continues to flow after the dimming and the stable control becomes possible. Since the voltage of the electrolytic capacitor can be increased, the electrolytic capacitor may be miniaturized and requires less capacitance, and the circuit and the lamp may be miniaturized.

In summary of the operations of the driving circuit 6 according to Embodiment 3, the capacitor C3 discharges when the switching element SW1 is ON (first state), and simultaneously, magnetic energy is stored in the inductor L35 with a current flowing from the capacitor C1 to the inductor L35 through the diode D2. When the switching element SW1 is OFF (second state), the magnetic energy stored in the inductor L35 is discharged to the capacitor C3, and simultaneously, a current flows from the capacitor C1 to the inductor L35 through the diode D2 to compensate for the energy discharged from the inductor L35. The driving circuit 6 alternates between the operations in the first and second states.

Accordingly, the driving circuit 6 according to Embodiment 3 can extend a period during which a current flows from the AC power supply 2 to the voltage conversion circuit 6A through the rectifying and smoothing circuit 11. Furthermore, the supply voltage VCC for driving the switching element SW1 can be secured from the capacitor C3 of the voltage conversion circuit 6A. Accordingly, the driving circuit 6 can improve the power factor and suppress abrupt change in luminance in the dimming. The diode D1 that accelerates the start-up of the voltage conversion circuit 6A at the initial stage may be eliminated. Furthermore, when the load 4 is open, the diode D1 having Zener characteristics can protect the voltage conversion circuit 6A by preventing excessive voltage rise in the capacitor C3.

Embodiment 4

An illumination light source 310 according to Embodiment 4 includes one of the driving circuits according to Embodiments 1 to 3, and an LED module. The illumination light source 310 according to Embodiment 4 will be described with reference to the drawings.

Figure 19:
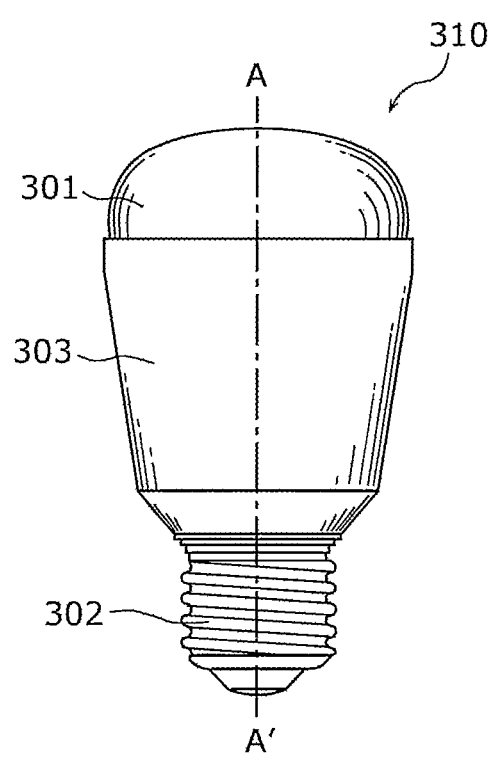
FIG. 19 schematically illustrates an illumination light source according to Embodiment 4.
Figure 20:
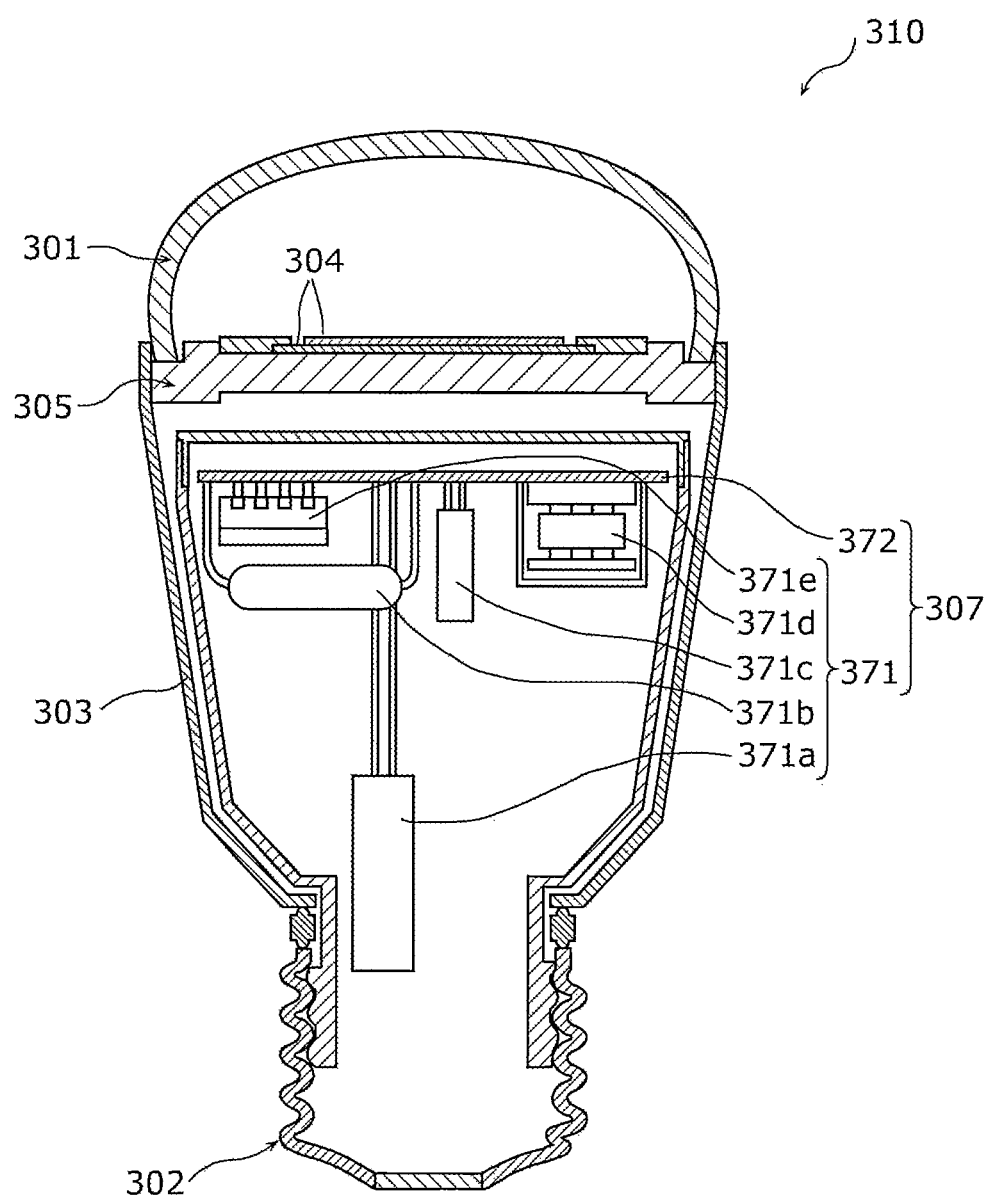
FIG. 20 is a cross-sectional view of the illumination light source taken along a central axis A-A' in FIG. 19.

FIG. 19 schematically illustrates the illumination light source 310 according to Embodiment 4, and FIG. 20 is a cross-sectional view of the illumination light source 310 taken along a central axis A-A' in FIG. 19.

The illumination light source 310 is an omnidirectional LED bulb lamp, and includes a lamp envelope including a globe 301, a base 302, and an outer case 303 between the globe 301 and the base 302.

The globe 301 is a spherical translucent cover for emitting light from a LED module 304, outside of the lamp. The LED module 304 is covered with the globe 301. The globe 301 has undergone a light diffusion treatment, such as a frosted glass treatment, to diffuse the light emitted from the LED module 304. The globe 301 may be a hemisphere, a spheroid, or an oblate spheroid, but not limited to a sphere. Furthermore, although the globe 301 is made of glass according to Embodiments 1 to 4, it may be made of synthetic resin glass.

The base 302 is a power receiving unit for receiving a dimming signal through two contacts. The dimming signal received by the base 302 is input to a power input unit of a circuit board 372 through a lead (not illustrated).

As illustrated in FIG. 20, the illumination light source 310 according to Embodiment 4 further includes the LED module 304, a light-source mount 305, and a driving circuit 307.

The LED module 304 is an example of a light source including a semiconductor light-emitting device, and a light-emitting module including an LED that emits predetermined light (light-emitting unit).

The light-source mount 305 is a holder (module plate) including a metal board for mounting the LED module 304, and is molded into a disc shape using an aluminum casting die.

The drive circuit 307 is one of the drive circuit 1 according to Embodiment 1, the drive circuit 5 according to Embodiment 2, and the drive circuit 6 according to Embodiment 3. The drive circuit 307 includes a circuit element group 371 which forms a circuit (power supply circuit) for causing the LED module 304 to emit light, and the circuit board 372 on which the circuit elements of the circuit element group 371 are mounted.

The circuit element group 371 includes the circuit elements for generating, from the dimming signal received by the base 302, power to cause the light source (LED module 304) to emit light. The circuit element group 371 converts the dimming signal received by the base 302 into a control signal that responds linearly according to a dimming level, and supplies the LED module 304 with a current corresponding to a voltage indicated by the control signal. The circuit element group 371 includes a first capacitor element 371a that is an electrolytic capacitor (vertical capacitor), a second capacitor element 371b that is a ceramic capacitor (horizontal capacitor), a resistor element 371c, a voltage converter 371d including a coil, and a semiconductor device 371e that is an integrated circuit in an intelligent power device (IPD).

The circuit board 372 is a disc-shaped a printed circuit board (PCB) having the circuit element group 371 mounted on one side. The circuit board 372 includes a notch. This notch forms a path through which a lead for supplying a current to the LED module 304 passes from the surface on which the circuit element group 371 has been mounted to the opposite surface.

Accordingly, the illumination light source 310 according to Embodiment 4 with the configuration can improve the power factor and suppress abrupt change in luminance in the dimming.

Embodiment 5

An illumination device 400 according to Embodiment 5 includes the illumination light source 310 according to Embodiment 4, and a dimmer that generates a dimming signal using AC power supply. The illumination device 400 according to Embodiment 5 will be described with reference to the drawings.

Figure 21:
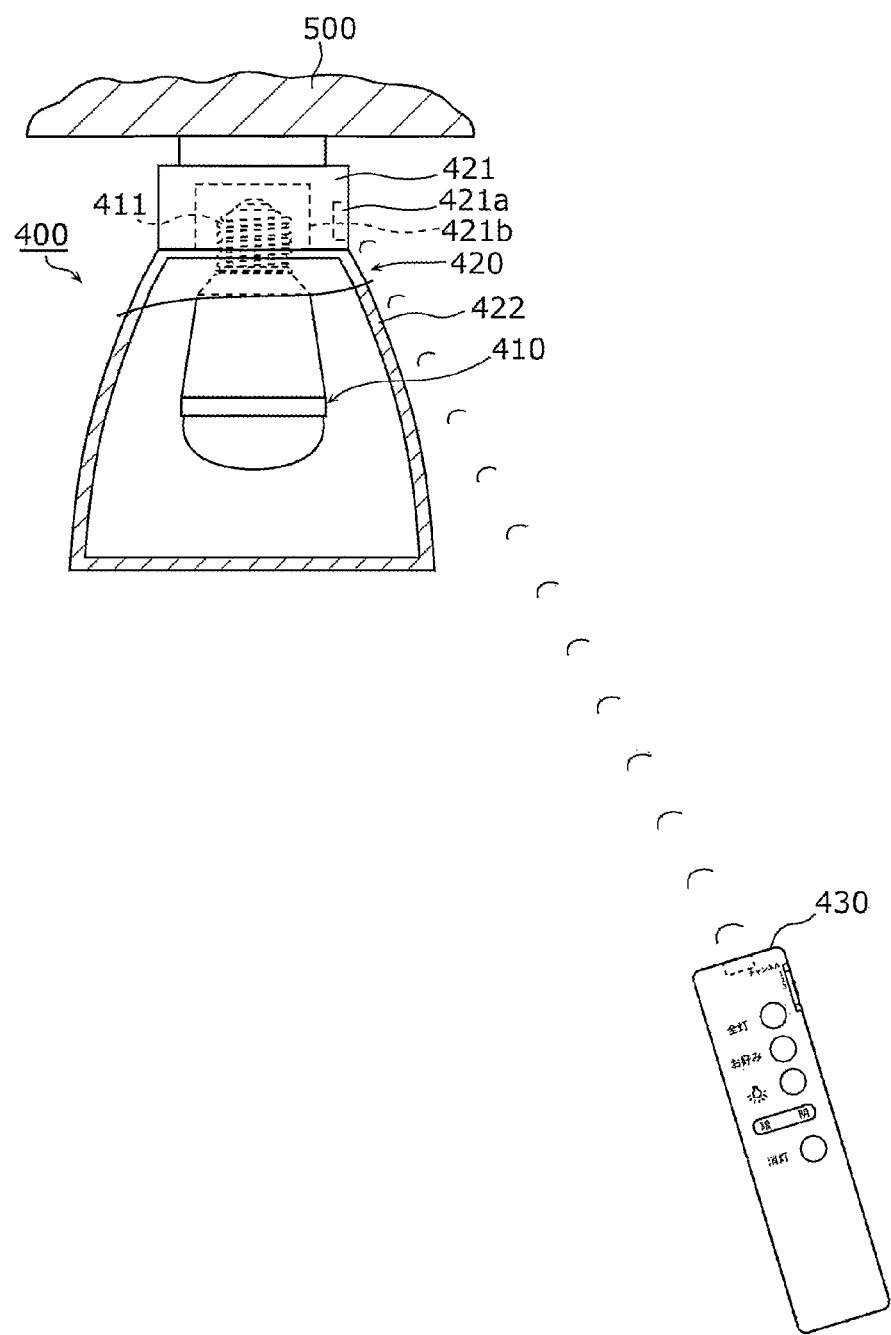
FIG. 21 schematically illustrates an illumination device according to Embodiment 5.

FIG. 21 schematically illustrates the illumination device 400 according to Embodiment 5.

The illumination device 400 according to Embodiment 5 is used, for example, mounted onto a ceiling 500 in a room. The illumination device 400 includes an illumination source 410, a lighting tool 420, and a remote control 430. The illumination light source 410 is the illumination light source 310 according to Embodiment 4. The remote control 430 receives an operation indicating a dimming level from the user, and transmits a signal indicating the received dimming level to the lighting tool 420.

The lighting tool 420 turns the illumination source 410 ON and OFF, and turns the illumination source 410 ON at luminance corresponding to the dimming level. The lighting tool 420 includes a tool body 421 to be mounted on the ceiling 500, and a lamp cover 422 which covers the illumination light source 410.

The tool body 421 includes a dimmer 421a, and a socket 421b into which a base 411 of the illumination light source 410 is screwed. The tool body 421 feeds the dimming signal to the illumination light source 410 via the socket 421b.

The dimmer 421a is, for example, the dimmer 3 in FIG. 1, which is a phase-control dimmer that receives a signal indicative of the dimming level transmitted from the remote control 430 and converts an AC signal input from the AC power source into a dimming signal corresponding to the dimming level received.

The illumination device 400 with the configuration does not change its brightness suddenly in response to a dimming level indicated by the user. In other words, the illumination device 400 can improve the power factor and suppress abrupt change in luminance in the dimming.

Although the driving circuits, the illumination light sources, and the illumination devices according to the present invention are described hereinbefore based on Embodiments 1 to 5 and the variations, the present invention is not limited by these Embodiments and the variations. Without departing from the scope of the present invention, the present invention includes an embodiment with some modifications conceived by a person skilled in the art added to Embodiments and the variations, and another embodiment obtained through combinations of the constituent elements of different Embodiments and the variations.

Although the dimmer 3 changes the firing angle according to the dimming level indicated by the user in the Description, the method for changing the firing angle by the dimmer 3 is not limited to the description herein. For example, the dimmer 3 may include an optical sensor, and change the firing angle according to the amount of light received by this optical sensor.

Although the illumination light source 410 is an LED bulb lamp in the Description, the present invention is applicable to illumination light sources with other shapes. For example, the present invention may be applicable to linear LED lamps.

Furthermore, although the Description describes the case where the illumination device includes the illumination light source and the dimmer, as long as the illumination device includes a driving circuit and an LED module, the illumination device does not have to include any enclosure, such as a globe and an outer case.

Furthermore, the illumination device 400 is an example, and may be any as long as it includes the dimmer 421a that converts an AC signal into a dimming signal and the socket 421b into which the base 411 of the illumination light source 410 is screwed. Furthermore, although the illumination device 400 in FIG. 21 includes one illumination light source, the illumination device 400 may include a plural number, e.g., two or more, of the illumination light sources.

Moreover, the circuit structures shown in the circuit diagrams above are by way of example and the present invention is not limited to the above circuit structures. Specifically, the present invention includes circuits which can implement the characteristic features of the present invention as with the circuit structures described above. For example, the present invention includes a certain element connected in series or in parallel to an element, such as a transistor, a resistor element, or a capacitor element as long as the certain element can achieve the same or similar functionality obtained from the circuit structures described above. In other words, "connected" in Embodiments 1 to 5 is not limited to directly connecting two terminals (nodes), and includes connecting two terminals (nodes) via an element as long as they can achieve the same or similar functionality obtained from the circuit structures described above.

Although the rectifying and smoothing circuit 11 that rectifies a dimming signal as a full-wave rectifier circuit includes a diode bridge in the Description, it is not limited such but may be a half-wave rectifier circuit, for example.

Furthermore, each of the driving circuits according to Embodiments 1 to 3 may be applicable as a circuit that turns ON an LED using a half-bridge inverter, or as a circuit that turns ON an LED by supplying an AC current.

INDUSTRIAL APPLICABILITY

Reference Signs List

1, 5, 6, 307 Driving circuit
1A, 5A, 6A Voltage conversion circuit
2 AC power supply
3 Dimmer
4 Load
11 Rectifying and smoothing circuit
12 Oscillating controller
13, 53, 63 Buck-boost unit
14 Dimming signal detection circuit
15 Power control circuit
301 Globe
302, 411 Base
303 Outer case
304 LED module
305 Light-source mount
310, 410 Illumination light source
371 Circuit element group
371a First capacitor element
371b Second capacitor element
371c Resistor element
371d Voltage converter
371e Semiconductor device
372 Circuit board
400 Illumination device
420 Lighting tool
421 Tool body
421a Dimmer
421b Socket
430 Remote control
500 Ceiling
C1, C3, C4, C7, C21, C22, C36 Capacitor
D1, D2, D5, D6, D7, D11, D12, D13, D14, D35, D37 Diode
I4, ID1, ID2, IL31, IL33, IL35 Current
L6, L31, L32, L33, L34, L35, L36 Inductor
R21, R22, R41, R42, R51, R52 Resistor element
SW1 Switching element
V4, V13, VC1, VC3, VD1, VD2, VD12, VL35, VDB Voltage
Z5 Zener diode

The invention claimed is:

1. A driving circuit that converts a phase-controlled AC dimming signal into a DC signal according to a dimming level, and causes a light-emitting device to emit light, using the DC signal, the driving circuit comprising:
   a rectifying circuit that rectifies the AC dimming signal; and a voltage conversion circuit that is connected between a low-potential output terminal and a high-potential output terminal of the rectifying circuit, and converts an input voltage from the rectifying circuit and applies a DC voltage to the light-emitting device, the voltage conversion circuit including:

a switching element having one end connected to the low-potential output terminal of the rectifying circuit;

a first diode having an anode connected to the high-potential output terminal of the rectifying circuit;

a first inductor having one end connected to a cathode of the first diode, and another end connected to another end of the switching element;

an oscillation controller that controls a pulse signal to be supplied to a control terminal that controls ON and OFF of the switching element;

a first capacitor that is charged by receiving magnetic energy from the first inductor when the switching element is OFF, and discharges to the light-emitting device when the switching element is ON; and a power control circuit that is connected to a high-potential terminal of the first capacitor and applies a voltage at the high-potential terminal of the first capacitor to the oscillation controller to stabilize a supply voltage for driving the oscillation controller, wherein the driving circuit alternates between a first state and a second state, the first state being a state in which when the switching element is ON, the first capacitor discharges and the magnetic energy is stored in the first inductor with a current flowing from the rectifying circuit to the first inductor through the first diode, the second state being a state in which when the switching element is OFF, the magnetic energy stored in the first inductor is discharged to the first capacitor, and the current flows from the rectifying circuit to the first inductor through the first diode to compensate for the magnetic energy discharged from the first inductor, and wherein the first capacitor, when discharging to the light-emitting device when the switching element is ON, stabilizes the supply voltage for driving the oscillation controller.

2. The driving circuit according to claim 1, further comprising:

a second inductor having one end connected to the one end of the first inductor, and another end connected to a cathode of the light-emitting device; and a second diode having an anode connected to the another end of the first inductor, and a cathode connected to the high-potential terminal of the first capacitor, wherein the high-potential terminal of the first capacitor is connected to an anode of the light-emitting device and to an input terminal of the power control circuit, and the first capacitor has a low-potential terminal connected to the low-potential output terminal of the rectifying circuit.

3. The driving circuit according to claim 1, further comprising:

a second capacitor inserted in series between the cathode of the first diode and the one end of the first inductor;

a second diode having an anode connected to a connecting point between the first diode and the second capacitor, and a cathode connected to the high-potential terminal of the first capacitor;

a second inductor having one end connected to the another end of the first inductor, and another end connected to the cathode of the second diode; and a third diode having an anode connected to the another end of the first inductor, and a cathode connected to an anode of the light-emitting device, wherein the high-potential terminal of the first capacitor is connected to an input terminal of the power control circuit, and the first capacitor has a low-potential terminal connected to the low-potential output terminal of the rectifying circuit.

4. The driving circuit according to claim 1, further comprising:

a second inductor having one end connected to the another end of the first inductor, and another end connected to a cathode of the light-emitting device;

a second diode having an anode connected to the cathode of the first diode, and a cathode connected to the high-potential terminal of the first capacitor; and a third diode having an anode connected to the another end of the first inductor, and a cathode connected to the high-potential terminal of the first capacitor, wherein the high-potential terminal of the first capacitor is connected to an anode of the light-emitting device and to an input terminal of the power control circuit, and the first capacitor has a low-potential terminal connected to the low-potential output terminal of the rectifying circuit.

5. The driving circuit according to claim 1, wherein the power control circuit includes:

a first resistor element having one end connected to the high-potential terminal of the first capacitor, and another end connected to a power supply terminal of the oscillation controller; and a Zener diode having an anode connected to the low-potential output terminal of the rectifying circuit, and a cathode connected to the power supply terminal.

6. The driving circuit according to claim 5, wherein the power control circuit further includes a second resistor element having one end connected to the high-potential output terminal of the rectifying circuit, and another end connected to the power supply terminal.

7. The driving circuit according to claim 1, further comprising a dimming signal detection circuit that applies to the oscillation controller a dimming signal voltage corresponding to a voltage obtained by rectifying the AC dimming signal by the rectifying circuit, wherein the oscillation controller controls the pulse signal based on the dimming signal voltage.

8. The driving circuit according to claim 7, wherein the dimming signal detection circuit includes:

a third resistor element having one end connected to the high-potential output terminal of the rectifying circuit, and another end connected to an input terminal of the oscillation controller to which the dimming signal voltage is applied;

a fourth resistor element having one end connected to the input terminal of the oscillation controller, and another end connected to the low-potential output terminal of the rectifying circuit; and a third capacitor having one end connected to the input terminal of the oscillation controller, and another end connected to the low-potential output terminal of the rectifying circuit.

9. An illumination light source, comprising:
a light-emitting device; and
a driving circuit that converts a phase-controlled AC dimming signal into a DC signal according to a dimming level, and causes the light-emitting device to emit light, using the DC signal,
wherein the driving circuit includes:
a rectifying circuit that rectifies the AC dimming signal; and
a voltage conversion circuit that is connected between a low-potential output terminal and a high-potential output terminal of the rectifying circuit, and converts an input voltage from the rectifying circuit and applies a DC voltage to the light-emitting device,
wherein the voltage conversion circuit includes:
a switching element having one end connected to the low-potential output terminal of the rectifying circuit;
a first diode having an anode connected to the high-potential output terminal of the rectifying circuit;
a first inductor having one end connected to a cathode of the first diode, and another end connected to another end of the switching element;
an oscillation controller that controls a pulse signal to be supplied to a control terminal that controls ON and OFF of the switching element;
a first capacitor that is charged by receiving magnetic energy from the first inductor when the switching element is OFF, and discharges to the light-emitting device when the switching element is ON; and
a power control circuit that is connected to a high-potential terminal of the first capacitor and applies a voltage at the high-potential terminal of the first capacitor to the oscillation controller to stabilize a power supply voltage for driving the oscillation controller, and
wherein the driving circuit alternates between a first state and a second state, the first state being a state in which when the switching element is ON, the first capacitor discharges and the magnetic energy is stored in the first inductor with a current flowing from the rectifying circuit to the first inductor through the first diode, the second state being a state in which when the switching element is OFF, the magnetic energy stored in the first inductor is discharged to the first capacitor, and the current flows from the rectifying circuit to the first inductor through the first diode to compensate for the magnetic energy discharged from the first inductor, and
wherein the first capacitor, when discharging to the light-emitting device when the switching element is ON, stabilizes the supply voltage for driving the oscillation controller.

10. An illumination device, comprising:
a light-emitting device;
a driving circuit that converts a phase-controlled AC dimming signal into a DC signal according to a dimming level, and causes the light-emitting device to emit light, using the DC signal; and
a dimmer that generates the AC dimming signal using an AC power supply,
wherein the driving circuit includes:
a rectifying circuit that rectifies the AC dimming signal; and
a voltage conversion circuit that is connected between a low-potential output terminal and a high-potential output terminal of the rectifying circuit, and converts an input voltage from the rectifying circuit and applies a DC voltage to the light-emitting device,
wherein the voltage conversion circuit includes:
a switching element having one end connected to the low-potential output terminal of the rectifying circuit;
a first diode having an anode connected to the high-potential output terminal of the rectifying circuit;
a first inductor having one end connected to a cathode of the first diode, and another end connected to another end of the switching element;
an oscillation controller that controls a pulse signal to be supplied to a control terminal that controls ON and OFF of the switching element;
a first capacitor that is charged by receiving magnetic energy from the first inductor when the switching element is OFF, and discharges to the light-emitting device when the switching element is ON; and
a power control circuit that is connected to a high-potential terminal of the first capacitor and applies a voltage at the high-potential terminal of the first capacitor to the oscillation controller to stabilize a power supply voltage for driving the oscillation controller, and
wherein the driving circuit alternates between a first state and a second state, the first state being a state in which when the switching element is ON, the first capacitor discharges and the magnetic energy is stored in the first inductor with a current flowing from the rectifying circuit to the first inductor through the first diode, the second state being a state in which when the switching element is OFF, the magnetic energy stored in the first inductor is discharged to the first capacitor, and the current flows from the rectifying circuit to the first inductor through the first diode to compensate for the magnetic energy discharged from the first inductor, and
wherein the first capacitor, when discharging to the light-emitting device when the switching element is ON, stabilizes the supply voltage for driving the oscillation controller.

* * * * *